US012365184B2

(12) United States Patent
Yamaguchi

(10) Patent No.: US 12,365,184 B2
(45) Date of Patent: Jul. 22, 2025

(54) LIQUID EJECTING APPARATUS

(71) Applicant: SEIKO EPSON CORPORATION, Tokyo (JP)

(72) Inventor: Kei Yamaguchi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 162 days.

(21) Appl. No.: 18/453,430

(22) Filed: Aug. 22, 2023

(65) Prior Publication Data

US 2024/0066878 A1 Feb. 29, 2024

(30) Foreign Application Priority Data

Aug. 23, 2022 (JP) ................................ 2022-132566

(51) Int. Cl.
*B41J 2/175* (2006.01)

(52) U.S. Cl.
CPC ....... *B41J 2/17513* (2013.01); *B41J 2/17523* (2013.01); *B41J 2/17596* (2013.01)

(58) Field of Classification Search
CPC .... B41J 2/175; B41J 2/17523; B41J 2/17596; B41J 1/243; B41J 1/246; B41J 2/17506; B41J 2/17509
See application file for complete search history.

(56) References Cited

U.S. PATENT DOCUMENTS

| | | | | |
|---|---|---|---|---|
| 9,789,685 B2 * | 10/2017 | Hanagami | ............ | B41J 2/04586 |
| 2012/0050418 A1 | 3/2012 | Tsujiuchi et al. | | |
| 2015/0042722 A1 * | 2/2015 | Watanabe | ............ | B41J 2/14145 347/44 |
| 2019/0184702 A1 * | 6/2019 | Takekoshi | ............. | B41J 2/1433 |

FOREIGN PATENT DOCUMENTS

| | | |
|---|---|---|
| JP | 2012-045805 A | 3/2012 |

* cited by examiner

*Primary Examiner* — Anh T Vo
(74) *Attorney, Agent, or Firm* — Harness, Dickey & Pierce, P.L.C.

(57) ABSTRACT

A liquid ejecting apparatus includes a liquid ejecting head including one of a first-flow path member and a second-flow path member, and a flow path structure body including another of the first-flow path member and the second-flow path member. The first-flow path member has a base portion and a first-flow path pipe protruding from the base portion in an insertion direction. The second-flow path member has a coupling surface having a first-opening portion that the first-flow path pipe is inserted and a first-guide portion disposed in a direction opposite to the insertion direction with respect to the coupling surface. The first-flow path pipe includes a first-insertion portion inserted into the first-opening portion and a first-guided portion that is guided by the first-guide portion before the first-insertion portion is inserted into the first-opening portion. The first-guided portion is disposed between the first-insertion portion and the base portion.

20 Claims, 20 Drawing Sheets

FIG. 16

| | FIRST GUIDE PORTION 81 | SECOND GUIDE PORTION 82 | THIRD GUIDE PORTION 83 | FOURTH GUIDE PORTION 84 |
|---|---|---|---|---|
| FIRST ARRANGEMENT DIRECTION DH1 DISPLACEMENT | — | FIRST GUIDED PORTION 711 | — | THIRD GUIDED PORTION 731 |
| SECOND ARRANGEMENT DIRECTION DH2 DISPLACEMENT | SECOND GUIDED PORTION 721 | — | FOURTH GUIDED PORTION 741 | — |
| THIRD ARRANGEMENT DIRECTION DH3 DISPLACEMENT | — | — | SEVENTH SUPPORT PORTION 771 | EIGHTH SUPPORT PORTION 781 |
| INVERSION | FOURTH GUIDED PORTION 741 | THIRD GUIDED PORTION 731 | SECOND GUIDED PORTION 721 | FIRST GUIDED PORTION 711 |
| ROTATION DISPLACEMENT | FIRST GUIDED PORTION 711 | — | — | — |

FIG. 24

| | FIRST GUIDE PORTION 81J | SECOND GUIDE PORTION 82J | THIRD GUIDE PORTION 83J | FOURTH GUIDE PORTION 84J |
|---|---|---|---|---|
| FIRST ARRANGEMENT DIRECTION DH1 DISPLACEMENT | — | FIRST GUIDED PORTION 711J | — | THIRD GUIDED PORTION 731J |
| SECOND ARRANGEMENT DIRECTION DH2 DISPLACEMENT | SECOND GUIDED PORTION 721J | — | FOURTH GUIDED PORTION 741J | — |
| THIRD ARRANGEMENT DIRECTION DH3 DISPLACEMENT | — | — | SEVENTH SUPPORT PORTION 771 | EIGHTH SUPPORT PORTION 781 |
| FOURTH ARRANGEMENT DIRECTION DH4 DISPLACEMENT | FIFTH SUPPORT PORTION 751 | SIXTH SUPPORT PORTION 761 | — | — |
| INVERSION | FOURTH GUIDED PORTION 741J | THIRD GUIDED PORTION 731J | SECOND GUIDED PORTION 721J | FIRST GUIDED PORTION 711J |
| INVERSION+FIRST ARRANGEMENT DIRECTION DH1 DISPLACEMENT | — | FOURTH GUIDED PORTION 741J | — | SECOND GUIDED PORTION 721J |
| INVERSION+SECOND ARRANGEMENT DIRECTION DH2 DISPLACEMENT | THIRD GUIDED PORTION 731J | — | FIRST GUIDED PORTION 711J | — |
| INVERSION+THIRD ARRANGEMENT DIRECTION DH3 DISPLACEMENT | — | — | SIXTH SUPPORT PORTION 761 | FIFTH SUPPORT PORTION 751 |
| INVERSION+FOURTH ARRANGEMENT DIRECTION DH4 DISPLACEMENT | EIGHTH SUPPORT PORTION 781 | SEVENTH SUPPORT PORTION 771 | — | — |
| ROTATION DISPLACEMENT | FIRST GUIDED PORTION 711J | — | — | — |

LIQUID EJECTING APPARATUS

The present application is based on, and claims priority from JP Application Serial Number 2022-132566, filed Aug. 23, 2022, the disclosure of which is hereby incorporated by reference herein in its entirety.

BACKGROUND

1. Technical Field

The present disclosure relates to a technique of a liquid ejecting apparatus.

2. Related Art

In related art, a liquid discharge apparatus including a liquid supply member that includes a liquid supply path which supplies a liquid and a positioning pin, and a liquid discharge head that includes an opening portion into which the liquid supply path is inserted and a positioning opening portion into which the positioning pin is inserted, is known (JP-A-2012-45805). In the technique, the length of the positioning pin is longer than the length of the liquid supply path. As a result, the liquid supply path is inserted into the opening portion after the positioning pin is inserted into the positioning opening portion to position the liquid supply member and the liquid discharge head.

In the technique in related art, the positioning pin is provided at a position different from the liquid supply path to position the liquid supply member and the liquid discharge head. Therefore, there is a concern that the size of the liquid supply member may increase in a direction perpendicular to an insertion and removal direction of the liquid supply path with respect to the opening portion. Further, In the technique in related art, in order to insert the positioning pin into the positioning opening portion before inserting the liquid supply path into the opening portion, the length of the positioning pin needs to be longer than the length of the liquid supply path. As a result, there is a concern that the size of the liquid supply member may increase in the insertion and removal direction of the liquid supply path with respect to the opening portion.

SUMMARY

1. According to a first aspect of the present disclosure, there is provided a liquid ejecting apparatus. The liquid ejecting apparatus includes a liquid ejecting head including one of a first flow path member and a second flow path member and configured to eject a liquid, and a flow path structure body including another of the first flow path member and the second flow path member, in which the liquid ejecting apparatus is configured to perform a coupling operation that couples the first flow path member to the second flow path member by relatively moving the first flow path member with respect to the second flow path member in an insertion direction, the first flow path member has a base portion and a first flow path pipe in which a flow path through which a liquid flows is formed and protruding from the base portion in the insertion direction, the second flow path member has a coupling surface having a first opening portion into which the first flow path pipe is inserted and a first guide portion disposed in a direction opposite to the insertion direction with respect to the coupling surface, the first flow path pipe includes a first insertion portion inserted into the first opening portion and a first guided portion that is guided by the first guide portion before the first insertion portion is inserted into the first opening portion in the coupling operation, and the first guided portion is disposed between the first insertion portion and the base portion.

2. According to a second aspect of the present disclosure, there is provided a liquid ejecting apparatus. The liquid ejecting apparatus includes a liquid ejecting head including one of a first flow path member and a second flow path member and configured to eject a liquid, and a flow path structure body including another of the first flow path member and the second flow path member, in which the liquid ejecting apparatus is configured to perform a coupling operation that couples the first flow path member to the second flow path member by relatively moving the first flow path member with respect to the second flow path member in an insertion direction, the first flow path member has a base portion and a first flow path pipe in which a flow path through which a liquid flows is formed and protruding from the base portion in the insertion direction, the second flow path member has a coupling surface having a first opening portion into which the first flow path pipe is inserted and a first guide portion disposed in a direction opposite to the insertion direction with respect to the coupling surface, the first flow path pipe includes a first insertion portion inserted into the first opening portion and a first guided portion disposed between the first insertion portion and the base portion, and a distance in the insertion direction from an end surface of the first guide portion in the direction opposite to the insertion direction to the coupling surface is larger than a distance in the insertion direction from a coupling portion between the first insertion portion and the first guided portion to an end portion of the first insertion portion in the insertion direction.

BRIEF DESCRIPTION OF THE DRAWINGS

FIG. 16 is a table summarizing aspects of preventing the erroneous insertion in the first embodiment.

FIG. 24 is a table summarizing aspects of preventing the erroneous insertion in the fifth embodiment.

DESCRIPTION OF EMBODIMENTS

A. First Embodiment

Figure 1:
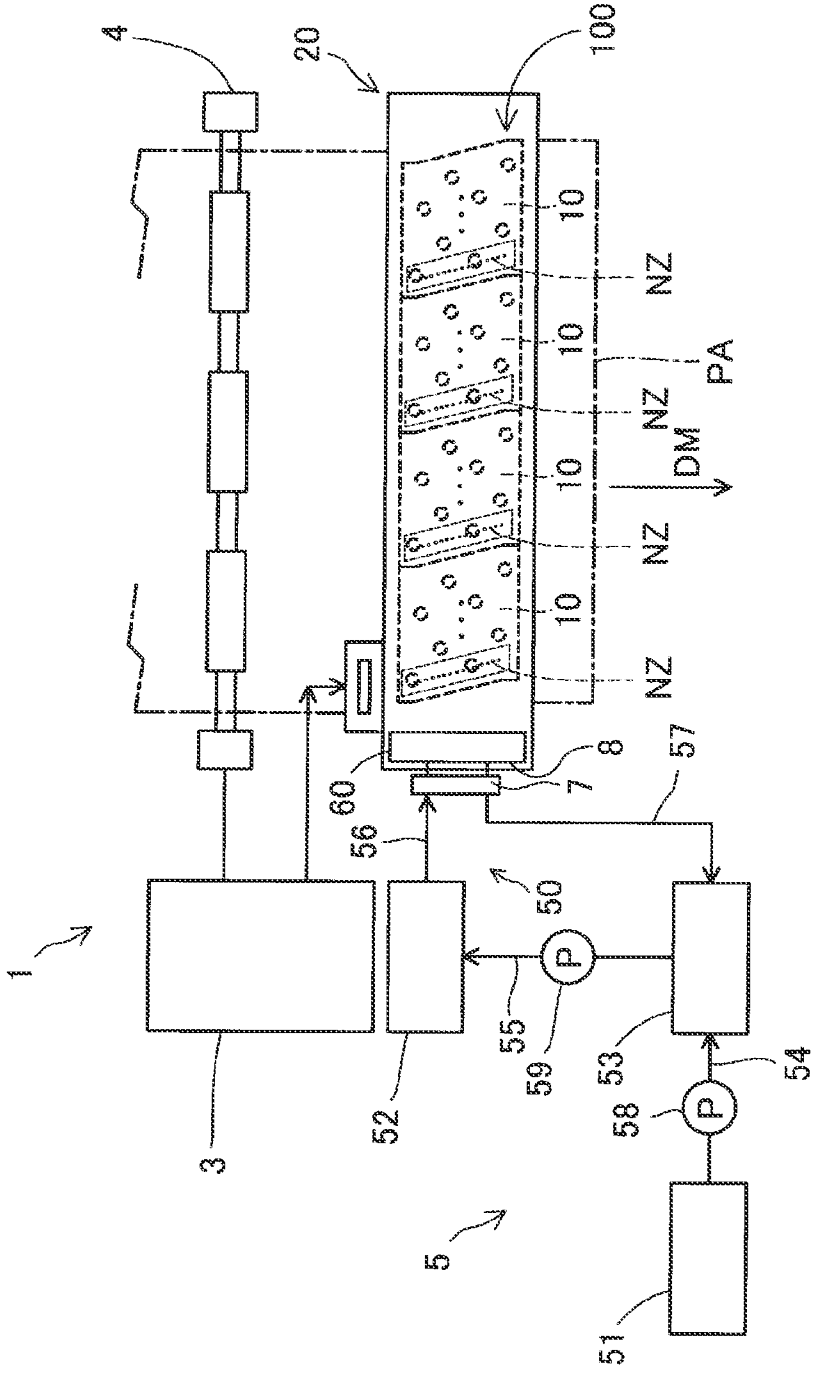
FIG. 1 is a schematic view of a liquid ejecting apparatus according to a first embodiment.

FIG. 1 is a schematic view showing a liquid ejecting apparatus 1 according to a first embodiment. The liquid ejecting apparatus 1 is an ink jet type printing apparatus that ejects ink, which is an example of a liquid, to a medium PA as liquid droplets. The liquid ejecting apparatus 1 of the present embodiment is a so-called line-type printing apparatus in which a plurality of nozzles NZ that eject ink are distributed in the entire range in the width direction of the medium PA. The medium PA is typically printing paper. The medium PA is not limited to printing paper and may be a printing target formed of an optional material such as a resin film or cloth.

The liquid ejecting apparatus 1 includes a control unit 3, a medium transport mechanism 4, a supply circulation mechanism 5, and a liquid ejecting head 20.

The control unit 3 controls an operation of each element of the liquid ejecting apparatus 1. The control unit 3 includes, for example, a processing circuit such as a CPU and an FPGA and a storage circuit such as a semiconductor memory. Various programs and various data are stored in the storage circuit. The processing circuit realizes various controls by executing various programs and using various data as appropriate. The CPU is an abbreviation of central processing unit. The FPGA is an abbreviation for field programmable gate array.

The medium transport mechanism 4 is controlled by the control unit 3 and transports the medium PA in a transport direction DM. The medium transport mechanism 4 includes a transport roller that is long along the width direction of the medium PA and a motor that rotates the transport roller. The medium transport mechanism 4 is not limited to the configuration using the transport roller and may have, for example, a configuration using a drum or an endless belt that transports the medium PA in a state in which the medium PA is adsorbed to an outer peripheral surface by an electrostatic force or the like.

The supply circulation mechanism 5 is a mechanism that supplies the liquid to the liquid ejecting head 20 and collects the liquid from the liquid ejecting head 20. The supply circulation mechanism 5 includes a main tank 51, a collection side sub tank 53, a supply side sub tank 52, a first intermediate flow path 54, a second intermediate flow path 55, a first pump 58, and a second pump 59, and a flow path structure body 50.

The main tank 51 stores ink as a liquid. The main tank 51 is, for example, an ink cartridge configured to be attached to and detached from the liquid ejecting apparatus 1, a bag-shaped ink pack formed of a flexible film, and an ink tank configured to be refilled with ink. The type of liquid stored in the main tank 51 is optional. In the present embodiment, the liquid ejecting apparatus 1 includes a plurality of main tanks 51 according to the type of ink. Specifically, the liquid ejecting apparatus 1 includes the main tank 51 that stores cyan ink, the main tank 51 that stores magenta ink, the main tank 51 that stores yellow ink, and the main tank 51 that stores black ink. Although a plurality of components such as the main tank 51 in the supply circulation mechanism 5 are provided according to the number of the main tanks 51, in FIG. 1, only each component of the supply circulation mechanism 5 corresponding to the one main tank 51 is shown as a representative.

The collection side sub tank 53 collects the liquid discharged from an ejecting portion 10 of the liquid ejecting head 20 via a flow path coupling member 60 provided in the liquid ejecting head 20 and a collection flow path 57 provided in the flow path structure body 50. The collection side sub tank 53 stores the collected liquid. Further, the collection side sub tank 53 is coupled to the main tank 51 via the first intermediate flow path 54. By driving the first pump 58, the liquid in the main tank 51 is supplied to the collection side sub tank 53 via the first intermediate flow path 54. The collection side sub tank 53 is coupled to the supply side sub tank 52 via the second intermediate flow path 55. By driving the second pump 59, the liquid in the collection side sub tank 53 is supplied to the supply side sub tank 52 via the second intermediate flow path 55. The main tank 51 may be coupled to the supply side sub tank 52 instead of the collection side sub tank 53.

The supply side sub tank 52 supplies the liquid to the flow path coupling member 60 via the supply flow path 56 provided in the flow path structure body 50. The first intermediate flow path 54, the second intermediate flow path 55, the supply flow path 56, and the collection flow path 57 described later are, for example, tubes through which the liquid flows. The first intermediate flow path 54, the second intermediate flow path 55, the supply flow path 56, and the collection flow path 57 may only be able to flow the liquid, and, for example, may be a structure body in which grooves or recess portions through which the liquid flows are formed. The first pump 58 and the second pump 59 are driven by a command of the control unit 3.

Figure 2:
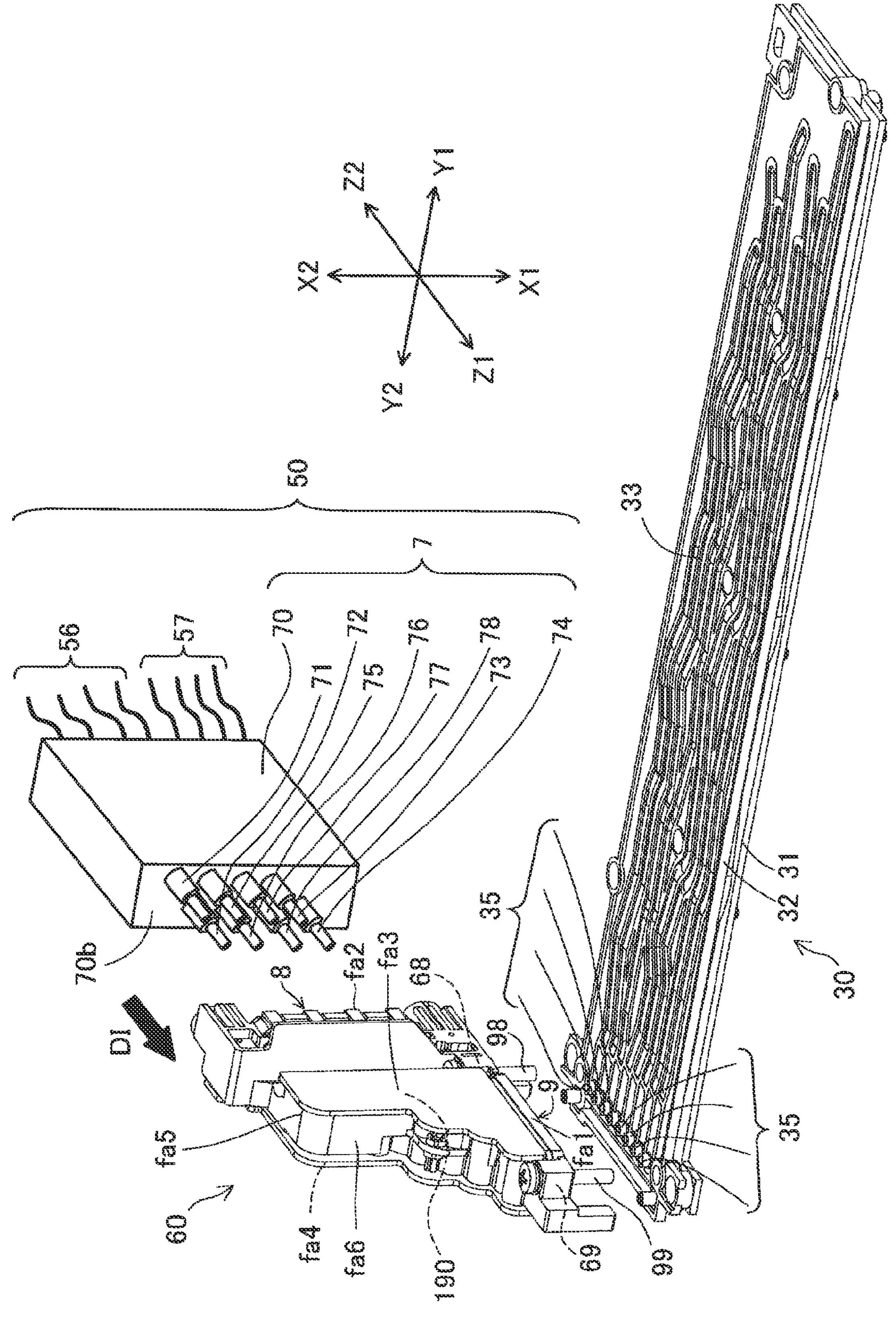
FIG. 2 is an exploded perspective view showing a portion of a configuration of a flow path structure body and a liquid ejecting head.

FIG. 2 is an exploded perspective view showing a portion of a configuration of the flow path structure body 50 and the liquid ejecting head 20. FIG. 2 shows XYZ axes which are three spatial axes orthogonal to each other. Directions in which arrows of the X-axis, the Y-axis, and the Z-axis are directed indicate positive directions along the X-axis, the Y-axis, and the Z-axis, respectively. The positive directions along the X-axis, the Y-axis, and the Z-axis are an X1 direction, a Y1 direction, and a Z1 direction, respectively.

Directions opposite to the directions in which the X-axis, the Y-axis, and the Z-axis are directed are negative directions along the X-axis, the Y-axis, and the Z-axis, respectively.

The negative directions along the X-axis, the Y-axis, and the Z-axis are an X2 direction, a Y2 direction, and a Z2 direction, respectively. When positiveness and negativeness in the directions along the X-axis, the Y-axis, and the Z-axis are not in question, the directions may be referred to as an X direction, a Y direction, and a Z direction, respectively. The same applies to the drawings and description made below. In the present embodiment, the X1 direction is the gravity direction.

The flow path structure body 50 has a supply flow path 56, a collection flow path 57, and a first flow path member 7. The supply flow path 56 communicates the supply side sub tank 52 with the first flow path member 7. The collection flow path 57 communicates the collection side sub tank 53 with the first flow path member 7. The supply flow path 56 and the collection flow path 57 are provided for each type of ink.

As shown in FIG. 2, in the present embodiment, the flow path structure body 50 is provided with a plurality of supply flow paths 56 and a plurality of collection flow paths 57. Specifically, the flow path structure body 50 includes the four supply flow paths 56 and the four collection flow paths 57. Each of the four supply flow paths 56 is a flow path for supplying any one of cyan, magenta, yellow, and black ink from the side of the supply side sub tank 52 to the side of the liquid ejecting head 20. Further, each of the four collection flow paths 57 is a flow path to flow any one of cyan, magenta, yellow, and black ink from the side of the liquid ejecting head 20 to the side of the collection side sub tank 53.

The first flow path member 7 shown in FIG. 2 is a flow path member that communicates the sides of the tanks 51 to 53 that store the liquid shown in FIG. 1 with the liquid ejecting head 20. As shown in FIG. 2, the liquid ejecting apparatus 1 is configured such that a coupling operation that couples the first flow path member 7 to the second flow path member 8 is possible by relatively moving the first flow path member 7 with respect to the second flow path member 8 in an insertion direction DI. In the present embodiment, the insertion direction DI is the Z1 direction. By the coupling operation, the sides of the tanks 51 to 53 that store the liquid shown in FIG. 1 and the liquid ejecting head 20 communicate with each other. That is, as shown in FIG. 2, the second flow path member 8 is a flow path member paired with the first flow path member 7, and a flow path member that communicates the sides of the tanks 51 to 53 that store the liquid with the liquid ejecting head 20. In the present embodiment, the first flow path member 7 is provided in the flow path structure body 50, and the second flow path member 8 is provided in the flow path coupling member 60. Details of the second flow path member 8 will be described later.

As shown in FIG. 2, the first flow path member 7 has a base portion 70, and one or more flow path pipes 71 to 78 protruding in the insertion direction DI from a facing surface **70*b* facing the second flow path member 8 in the coupling operation from the base portion 70. In the present embodiment, the first flow path member 7 has a plurality of flow path pipes 71 to 78. In-pipe flow paths 718 to 788 through which the liquid flows are formed in the plurality of flow path pipes 71 to 78. The plurality of supply flow paths 56 and the plurality of collection flow paths 57 according to the type of ink are coupled to the in-pipe flow paths 718 to 788 of the corresponding flow path pipes 71 to 78**.

As shown in FIG. 2, in the present embodiment, the plurality of flow path pipes 71 to 78 are the first flow path pipe 71, the second flow path pipe 72, the third flow path pipe 73, the fourth flow path pipe 74, the fifth flow path pipe 75, the sixth flow path pipe 76, the seventh flow path pipe 77, and the eighth flow path pipe 78. Each of four flow path pipes (hereinafter, may be referred to as a collection flow path pipe) out of the plurality of flow path pipes 71 to 78 communicates with any of a plurality of inter-member flow paths 190, which are provided on the second flow path member 8 on the side of the insertion direction DI and will be described later, and communicates with any of the four collection flow paths 57 on the side of a direction opposite to the insertion direction DI. That is, each of the in-pipe flow paths formed inside the four collection flow path pipes flows any one of cyan, magenta, yellow, and black ink collected from the ejecting portion 10 of the liquid ejecting head 20, to any one of the four collection flow paths 57. Each of four flow path pipes (hereinafter, may be referred to as a supply flow path pipe) different from the four flow path pipes described above among the plurality of flow path pipes 71 to 78 communicates with any of the plurality of inter-member flow paths 190, which are provided on the second flow path member 8 on the side of the insertion direction DI and will be described later, and communicates with any of the four supply flow paths 56 on the side of the direction opposite to the insertion direction DI. That is, each of the in-pipe flow paths formed inside the four supply flow path pipes flows any one of cyan, magenta, yellow, and black ink supplied from the supply flow path 56 to the side of the liquid ejecting head 20. In other embodiments, the flow path pipes 71 to 78 may be flow path needles in which a flow path through which the liquid flows is formed.

Figure 3:
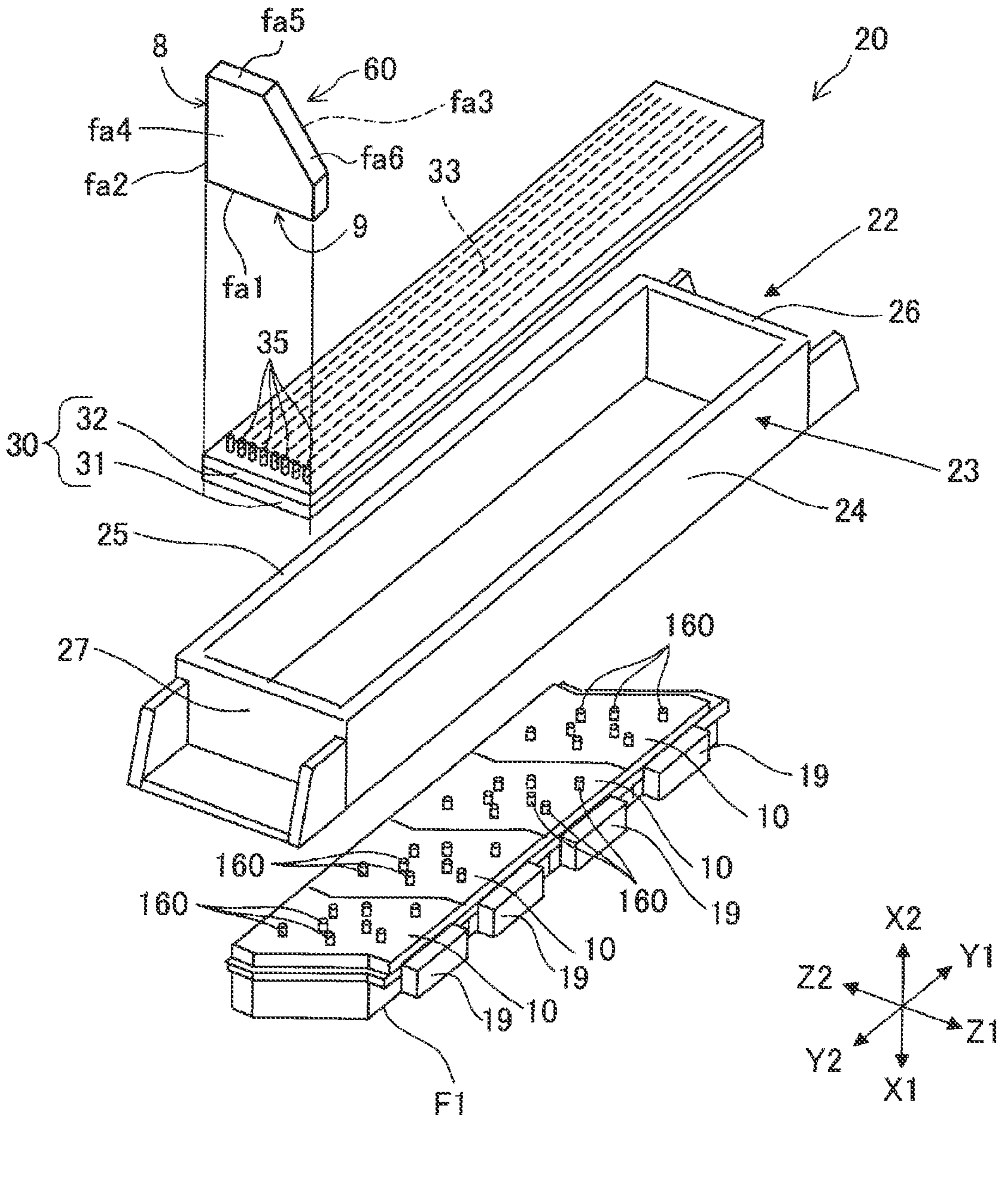
FIG. 3 is an exploded perspective view of the liquid ejecting head.

FIG. 3 is an exploded perspective view of the liquid ejecting head 20. The liquid ejecting head 20 has a support member 22, the ejecting portion 10, a common flow path member 30 communicating with the ejecting portion 10, and the flow path coupling member 60 communicating with the common flow path member 30.

The support member 22 supports the ejecting portion 10 and the common flow path member 30. Most of the ejecting portion 10 is accommodated in the support member 22. A portion of the ejecting portion 10 in the X1 direction including an ejecting surface F1 is disposed outside the support member 22. The ejecting surface F1 is exposed to the outside. The common flow path member 30 is accommodated in the support member 22. The support member 22 includes a frame portion 23. The frame portion 23 has a short shape when viewed in the X-axis direction. The frame portion 23 has side walls 24 to 27.

As shown in FIG. 3, the ejecting portion 10 has a plurality of end side coupling pipes 160 protruding toward the side of the common flow path member 30, a plurality of in-head flow paths (not shown), and the nozzle NZ shown in FIG. 1. Each of the plurality of end side coupling pipes 160 communicates with the corresponding in-head flow path. Further, the plurality of in-head flow paths communicate with the corresponding nozzles NZ. The nozzle NZ ejects the liquid supplied from the common flow path member 30 shown in FIG. 3. As shown in FIG. 1, the liquid ejected from the nozzle NZ lands on the medium PA. As shown in FIG. 3, the ejecting portions 10 are arranged in a direction intersecting the transport direction DM to form a line head 100.

The ejecting portion 10 further includes a connector 19. An electric path for electrically coupling to the control unit 3 shown in FIG. 1 is coupled to the connector 19. As a result, the ejecting portion 10 is controlled by the control unit 3.

As shown in FIG. 3, the common flow path member 30 communicates the flow path coupling member 60 with the ejecting portion 10. The common flow path member 30 is formed by stacking the first common flow path substrate 31 and the second common flow path substrate 32 in the X-axis direction. The first common flow path substrate 31 is positioned on the side of the ejecting portion 10.

The second common flow path substrate 32 is positioned on the side of the flow path coupling member 60. The second common flow path substrate 32 has one or more substrate side coupling pipes 35 protruding to the side of the flow path coupling member 60. The substrate side coupling pipe 35 is provided for each type of ink and use of ink. For the use of ink referred to here, the ink is, for example, supply side ink supplied toward the ejecting portion 10 to eject the ink onto the medium PA for printing, or collection side ink being discharged from the ejecting portion 10 and collected, or the like. In the present embodiment, the common flow path member 30 has a plurality of substrate side coupling pipes 35.

The substrate side coupling pipe 35 is coupled to the flow path coupling member 60.

As shown in FIG. 3, the common flow path member 30 further has a plurality of internal flow paths 33 communicating with each of the plurality of substrate side coupling pipes 35. The internal flow path 33 is a flow path formed inside the common flow path member 30 by stacking the first common flow path substrate 31 and the second common flow path substrate 32. The internal flow path 33 is formed by, for example, grooves formed in the first common flow path substrate 31 and the second common flow path substrate 32 that closes the grooves. A portion of the plurality of internal flow paths 33 is a flow path that supplies the liquid supplied from the flow path coupling member 60 to the ejecting portion 10. Further, the rest of the plurality of internal flow paths 33 is a flow path that flows the liquid from the ejecting portion 10 to the flow path coupling member 60. The first common flow path substrate 31 of the common flow path member 30 further has a plurality of common coupling portions coupled to a plurality of end side coupling pipes 160 of the ejecting portion 10 on a surface facing the ejecting portion 10. Each of the plurality of common coupling portions communicates with the corresponding internal flow path 33.

As shown in FIG. 2, each of the plurality of substrate side coupling pipes 35 of the common flow path member 30 is coupled to a receiving flow path member 9 of the flow path coupling member 60. As a result, the internal flow path 33 and the inter-member flow path 190 communicate with each other. The common flow path member 30 of the present embodiment has the eight substrate side coupling pipes 35. Each of the four substrate side coupling pipes 35 forms a flow path to collect any one of cyan, magenta, yellow, and black ink from the ejecting portion 10. Further, each of the remaining four substrate side coupling pipes 35 forms a flow path to supply any one of cyan, magenta, yellow, and black ink to the ejecting portion 10.

As shown in FIG. 2, the flow path coupling member 60 is a member to couple the liquid ejecting head 20 to the flow path structure body 50. In other words, the flow path coupling member 60 is a member to couple the common flow path member 30 to the flow path structure body 50. In the present embodiment, the shape of the flow path coupling member 60 is a plate shape having the smallest dimension in the Y direction. The flow path coupling member 60 is fixed to the common flow path member 30 by screws 98 and 99. The flow path coupling member 60 is provided with insertion holes 68 and 69 through which the screws 98 and 99 are inserted.

As shown in FIG. 2, the outer shape of the flow path coupling member 60 is formed by a first outer surface fa1, a second outer surface fa2, a third outer surface fa3, a fourth outer surface fa4, a fifth outer surface fa5, and a sixth outer surface fa6. In the present embodiment, the first outer surface fa1 forms the outer surface of the flow path coupling member 60 on the side of the X1 direction. The second outer surface fa2 forms an outer surface of the flow path coupling member 60 on the side of the Z2 direction. The third outer surface fa3 forms an outer surface of the flow path coupling member 60 on the side of the Y1 direction. The fourth outer surface fa4 forms an outer surface of the flow path coupling member 60 on the side of the Y2 direction. The fifth outer surface fa5 forms an outer surface of the flow path coupling member 60 on the side of the X2 direction. The sixth outer surface fa6 forms an outer surface of the flow path coupling member 60 on the side of the Z1 direction. Therefore, the first outer surface fa1 and the fifth outer surface fa5 face each other in the X direction. The third outer surface fa3 and the fourth outer surface fa4 face each other in the Y direction. The second outer surface fa2 and the sixth outer surface fa6 face each other in the Z direction. Further, the first outer surface fa1 and the fifth outer surface fa5 intersect with the third outer surface fa3 and the fourth outer surface fa4, respectively. The third outer surface fa3 and the fourth outer surface fa4 intersect the second outer surface fa2 and the sixth outer surface fa6, respectively. Each of the outer surfaces fa1 to fa6 of the flow path coupling member 60 is not limited to a planar surface, and may be a surface or a curved surface including unevenness. Further, in the present embodiment, the outer surfaces fa1 to fa6 intersect each other to be orthogonal to each other, but the present disclosure is not limited thereto, and for example, the outer surfaces may intersect each other at an angle of 80° or more and less than 90°.

Figure 4:
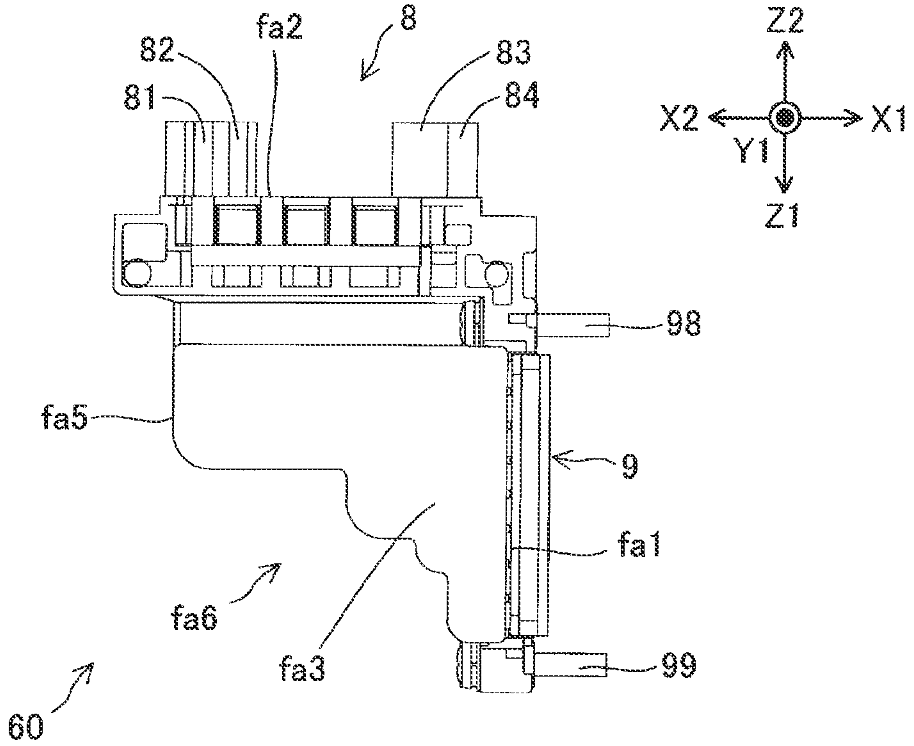
FIG. 4 is a view of a flow path coupling member as viewed from a third outer surface side.
Figure 5:
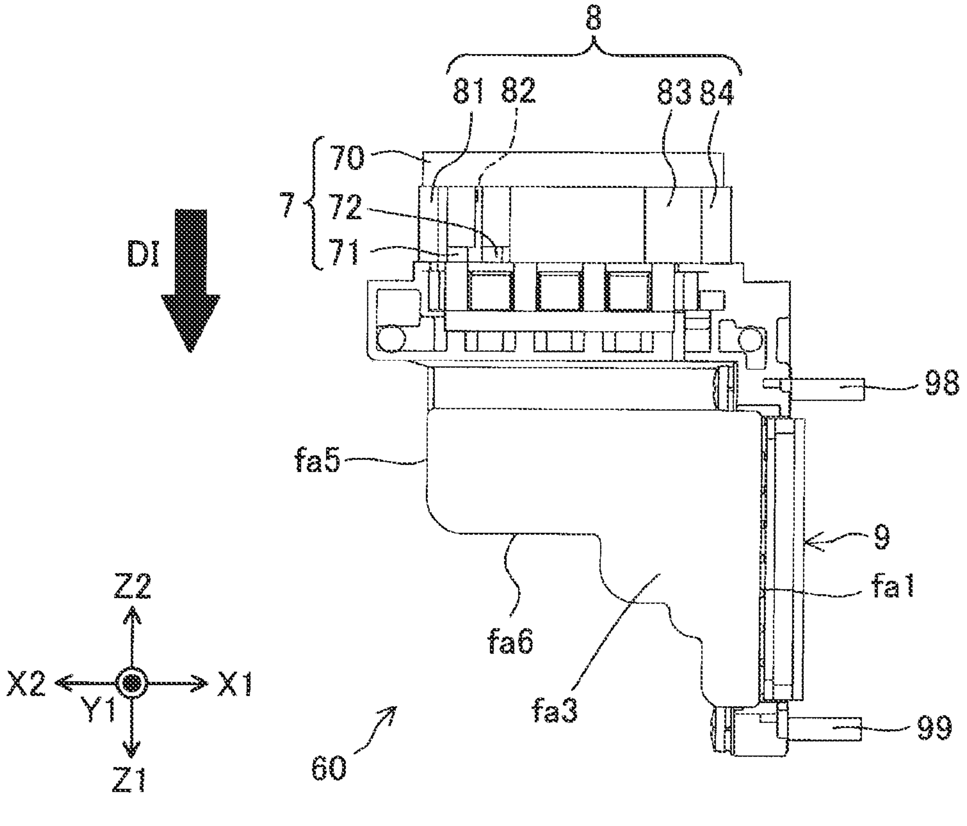
FIG. 5 is a view of the flow path coupling member in a coupled state as viewed from the third outer surface side.
Figure 6:
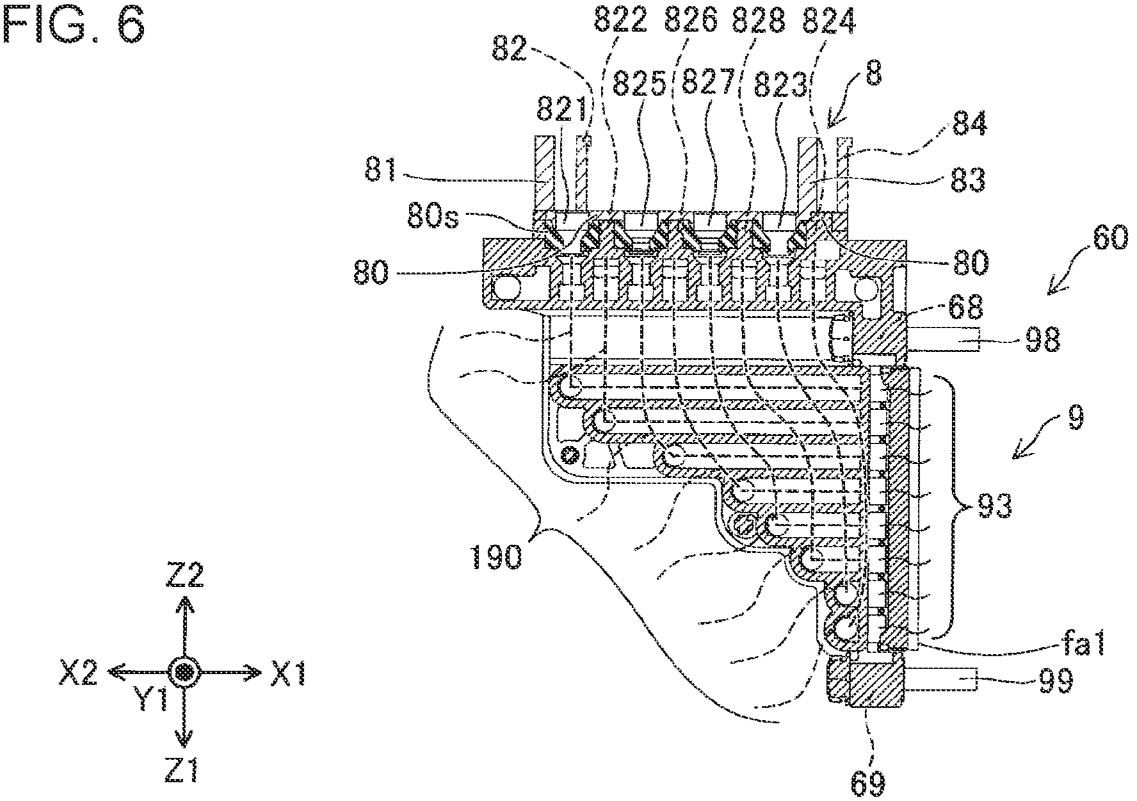
FIG. 6 is a view showing an internal structure of the flow path coupling member.

FIG. 4 is a view of the flow path coupling member 60 as viewed from the side of the third outer surface fa3. FIG. 5 is a view of the flow path coupling member 60 in a coupled state in which the first flow path member 7 is coupled to the second flow path member 8 as viewed from the side of the third outer surface fa3. In addition, in order to prevent the drawing from becoming complicated, in FIG. 5, among the flow path pipes 71 to 78 of the second flow path member 8, the flow path pipes 73 to 78 are omitted, and only the first flow path pipe 71 and the second flow path pipe 72 are shown. FIG. 6 is a view showing an internal structure of the flow path coupling member 60.

Figure 7:
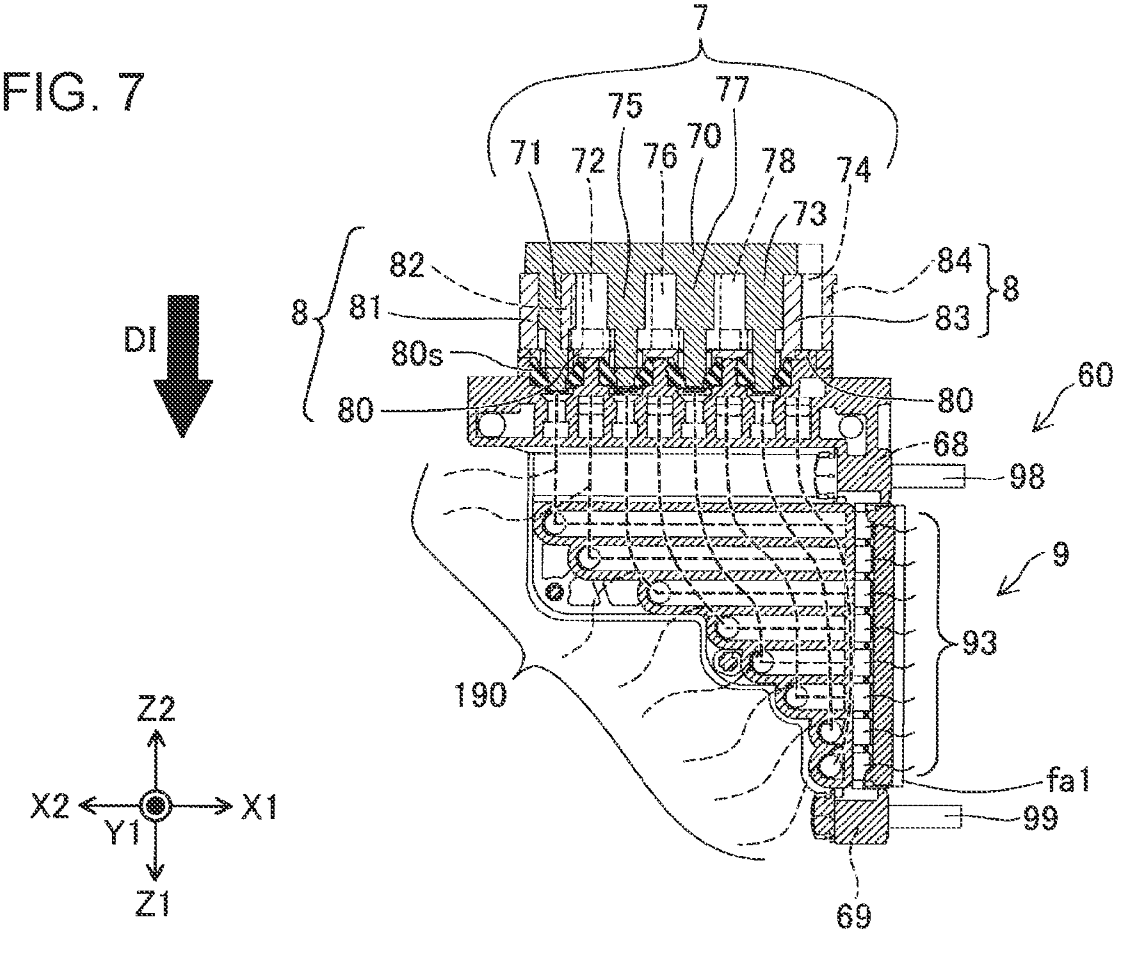
FIG. 7 is a view showing an internal structure of the flow path coupling member and a second flow path member in a coupled state.

FIG. 6 is a cross-sectional perspective view of a cross section when the flow path coupling member 60 shown in FIG. 4 is cut in an XZ plane, as viewed from the side of the Y1 direction. FIG. 7 is a view showing an internal structure of the flow path coupling member 60 and the second flow path member 8 in a coupled state. FIG. 7 is a cross-sectional perspective view of a cross section when the flow path coupling member 60 and the second flow path member 8 shown in FIG. 5 are cut in the XZ plane as viewed from the side of the Y1 direction.

As shown in FIGS. 6 and 7, the flow path coupling member 60 includes the plurality of inter-member flow paths 190 that communicates the common flow path member 30 with the flow path structure body 50, the receiving flow path member 9 provided at one end of the inter-member flow path 190, and the second flow path member 8 provided at the other end of the inter-member flow path 190. In the present embodiment, the receiving flow path member 9 is formed on the first outer surface fa1 of the flow path coupling member 60, as shown in FIG. 4. The second flow path member 8 is formed on the second outer surface fa2.

In the present embodiment, as shown in FIG. 7, the flow path coupling member 60 has the eight inter-member flow paths 190. Each of the plurality of inter-member flow paths 190 communicates each of the first flow path pipe 71 to the eighth flow path pipe 78 of the second flow path member 8 provided in the flow path structure body 50 shown in FIG. 2, with each of the plurality of substrate side coupling pipes 35 of the common flow path member 30. That is, each of the four inter-member flow paths 190 out of the eight inter-member flow paths 190 flows any one of the cyan, magenta, yellow, and black inks collected from the ejecting portion 10 of the liquid ejecting head 20, to any one of the four collection flow path pipes. Further, each of the remaining four inter-member flow paths 190 flows any one of cyan, magenta, yellow, and black ink supplied from the four supply flow path pipes to the side of the ejecting portion 10.

The receiving flow path member 9 has a plurality of receiving opening portions 93 into which the plurality of substrate side coupling pipes 35 shown in FIG. 2 are inserted, respectively. The plurality of receiving opening portions 93 are formed at positions corresponding to each of the plurality of substrate side coupling pipes 35 provided in the common flow path member 30. In the present embodiment, as shown in FIG. 2, the plurality of substrate side coupling pipes 35 are arranged in one row along the Z direction. Therefore, as shown in FIGS. 6 and 7, the plurality of receiving opening portions 93 are arranged in one row along the Z direction. The flow path coupling member 60 of the present embodiment has the eight plurality of receiving opening portions 93. As shown in FIG. 7, each of the plurality of receiving opening portions 93 forms one end of each of the plurality of inter-member flow paths 190. As a result, as shown in FIG. 2, the internal flow path 33 of the common flow path member 30 communicates with the inter-member flow path 190 of the flow path coupling member 60.

Figure 8:
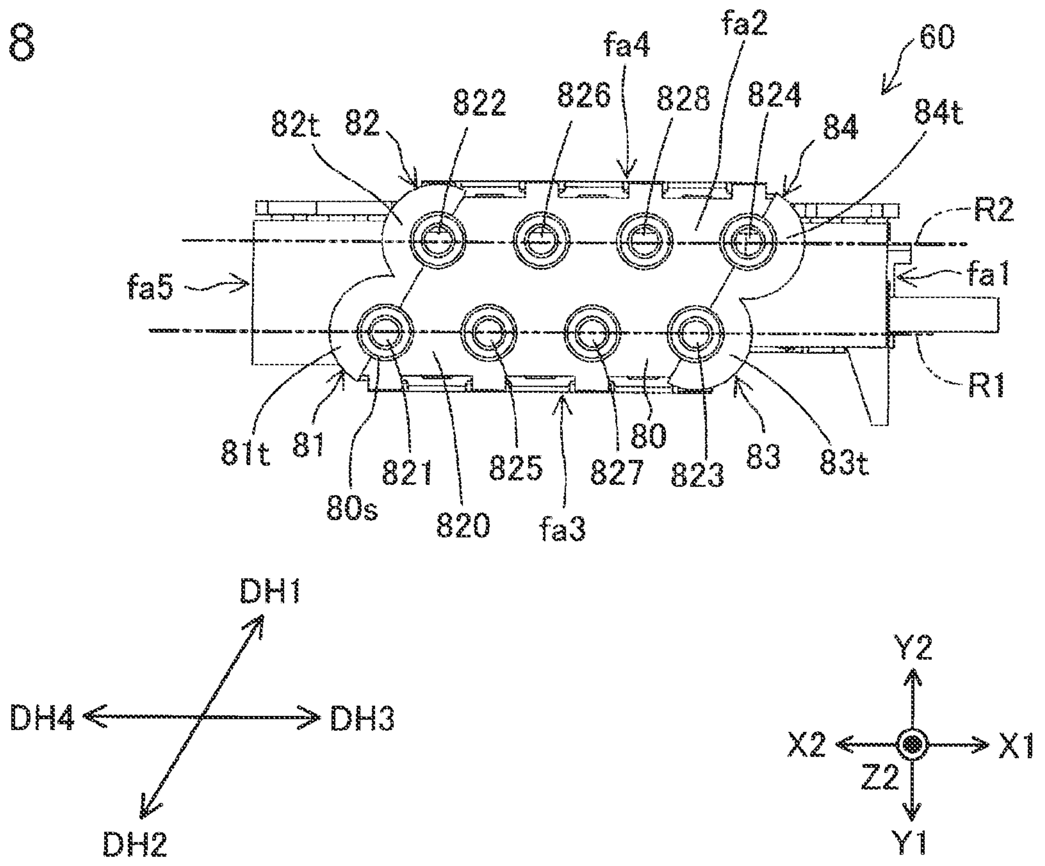
FIG. 8 is a view of the flow path coupling member as viewed from a second outer surface side.
Figure 9:
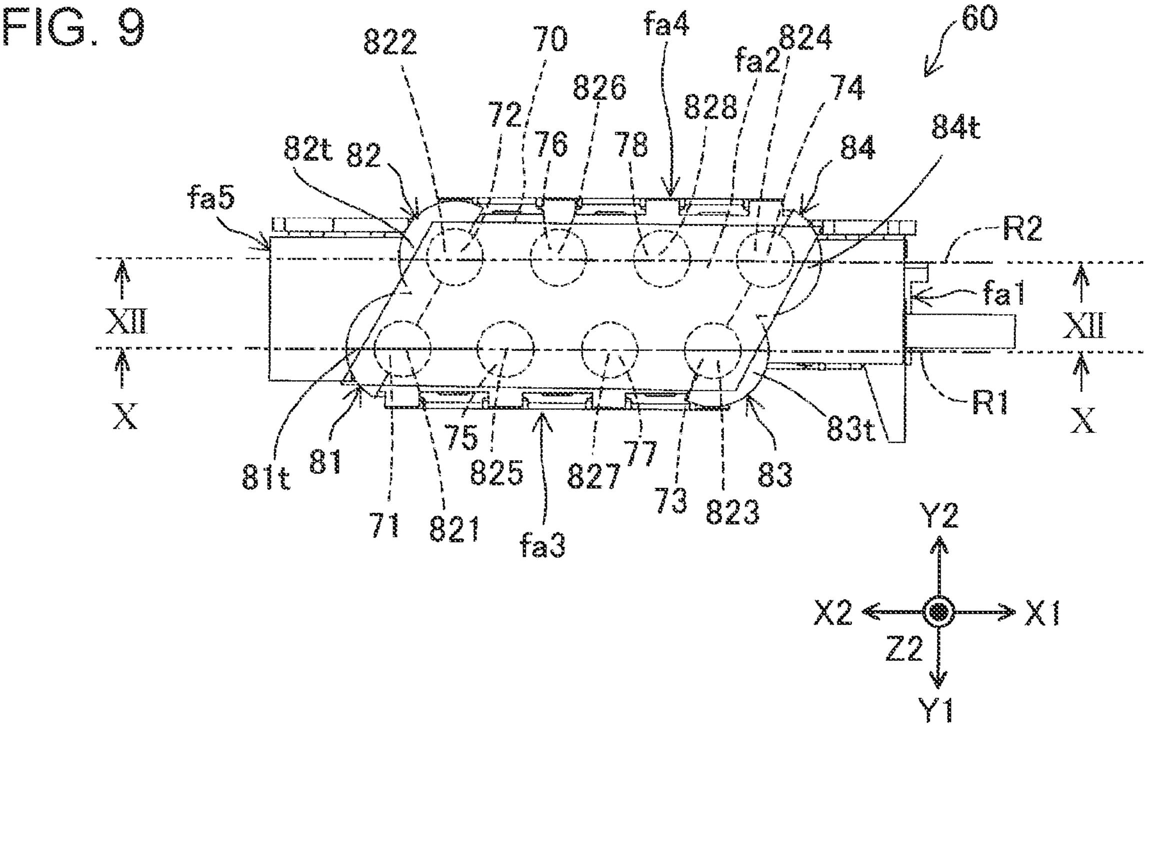
FIG. 9 is a view of the flow path coupling member in a coupled state as viewed from the second outer surface side.
Figure 10:
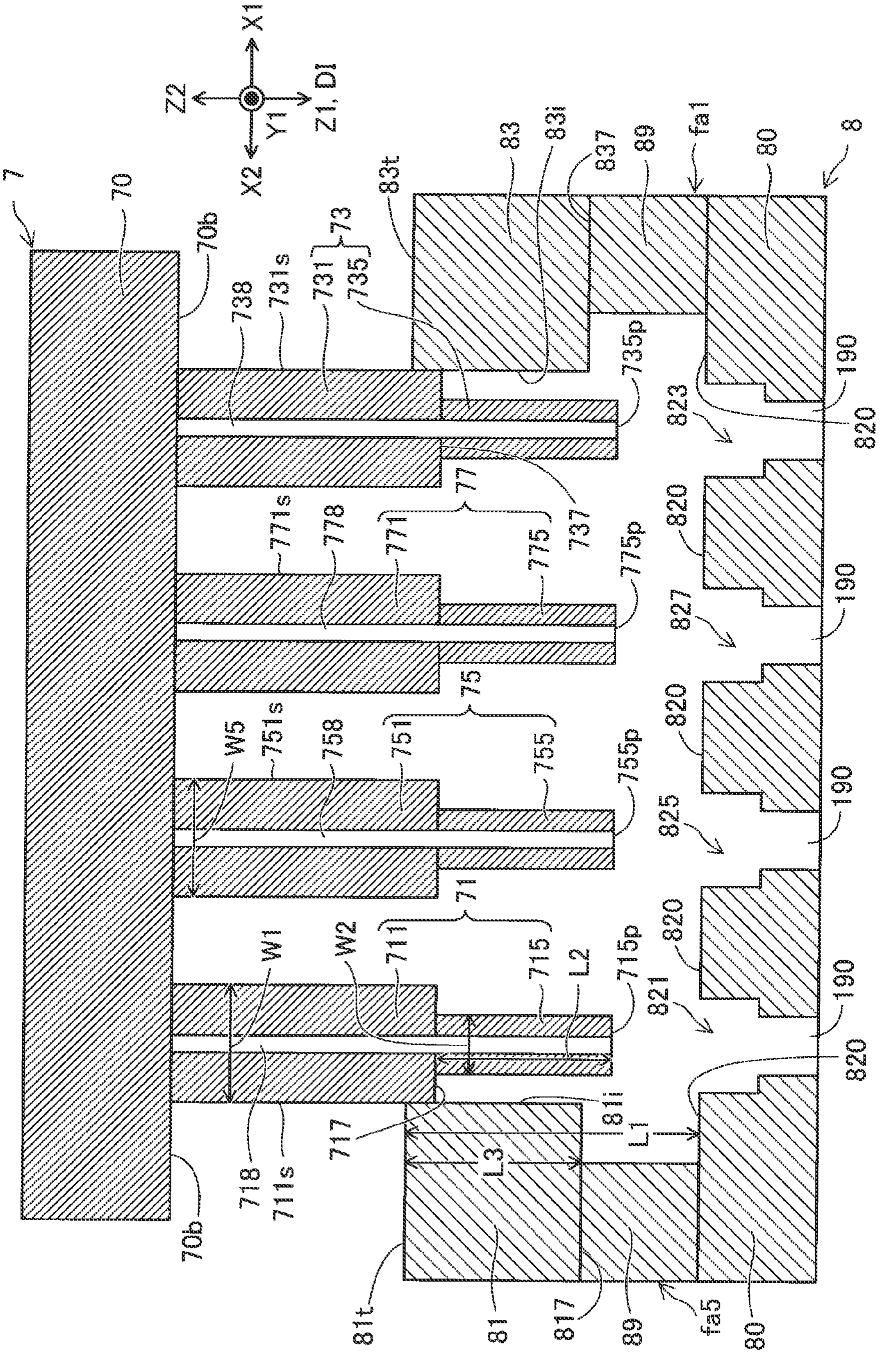
FIG. 10 is a first view showing a first flow path member and the second flow path member during a coupling operation.
Figure 11:
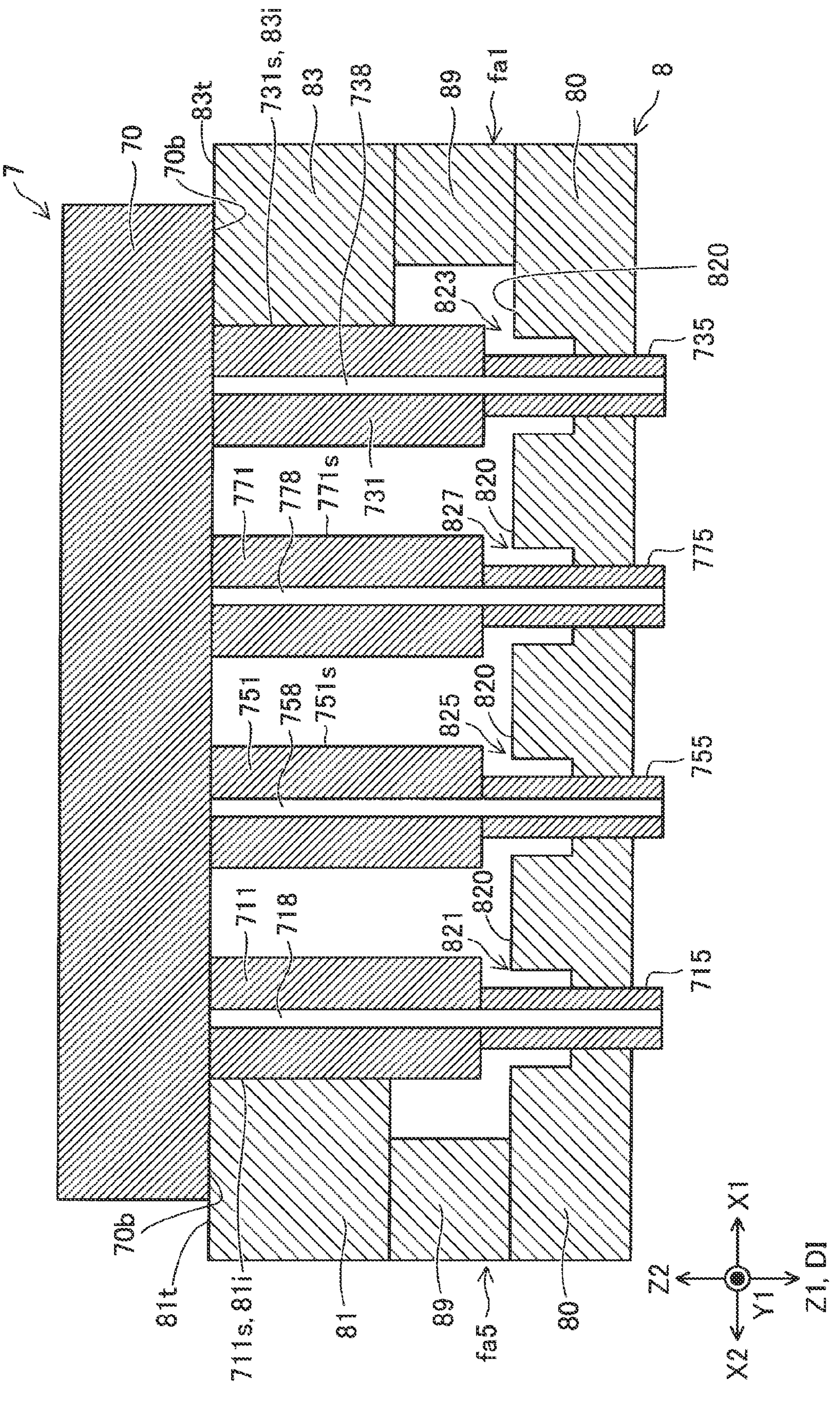
FIG. 11 is a view showing the first flow path member and the second flow path member after the coupling operation is completed.
Figure 12:
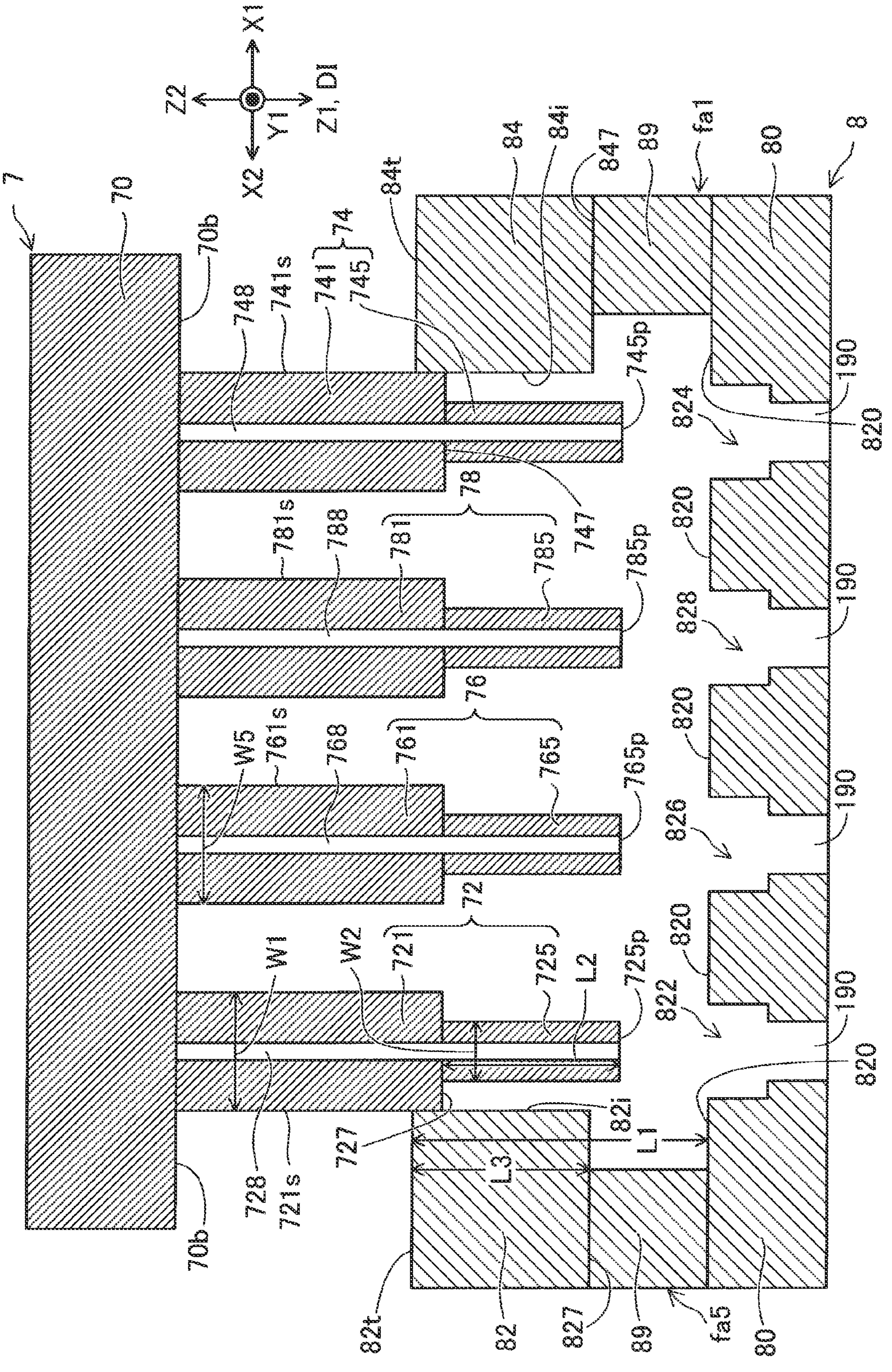
FIG. 12 is a second view showing the first flow path member and the second flow path member during the coupling operation.

FIG. 8 is a view of the flow path coupling member 60 as viewed from the side of the second outer surface fa2. FIG. 9 is a view of the flow path coupling member 60 in a coupled state in which the first flow path member 7 is coupled to the second flow path member 8 as viewed from the side of the second outer surface fa2. In FIG. 9, the base portion 70 is indicated by a dotted line. FIG. 10 is a first view showing the first flow path member 7 and the second flow path member 8 during the coupling operation of the first flow path member 7 with respect to the second flow path member 8. FIG. 10 schematically shows a portion of an X-X cross section of FIG. 9. FIG. 11 is a view showing the first flow path member 7 and the second flow path member 8 after the coupling operation is completed, that is, in a coupled state in which the first flow path member 7 is coupled to the second flow path member 8. FIG. 12 is a second view showing the first flow path member 7 and the second flow path member 8 during the coupling operation of the first flow path member 7 with respect to the second flow path member 8. FIG. 12 schematically shows a portion of a XII-XII cross section of FIG. 9.

As shown in FIGS. 10 and 12, the second flow path member 8 includes a coupling surface 820 having opening portions 821 to 828 into which the flow path pipes 71 to 78 are inserted, a pedestal portion 80 having the coupling surface 820, one or more guide portions 81 to 84, and an intermediate portion 89 provided between the guide portions 81 to 84 and the pedestal portion 80. In FIGS. 6 and 7, the intermediate portion 89 is not shown.

The opening portions 821 to 828 shown in FIGS. 10 and 12 may open in the horizontal direction along the Y direction and the Z direction, for example, and may open in the antigravity direction along the X2 direction. Further, the opening portions 821 to 828 may open in a direction obliquely downward in the gravity direction or obliquely upward in the gravity direction. In the present embodiment, the shapes of the opening portions 821 to 828 are circular shapes, but the present disclosure is not limited thereto. The shape of the opening portions 821 to 828 may be any shape into which corresponding insertion portions 715 to 785, which will be described later, can be inserted.

As shown in FIGS. 10 and 12, in the present embodiment, a plurality of opening portions 821 to 828 are the first opening portion 821 into which the first flow path pipe 71 is inserted, the second opening portion 822 into which the second flow path pipe 72 is inserted, the third opening portion 823 into which the third flow path pipe 73 is inserted, the fourth opening portion 824 into which the fourth flow path pipe 74 is inserted, the fifth opening portion 825 into which the fifth flow path pipe 75 is inserted, the sixth opening portion 826 into which the sixth flow path pipe 76 is inserted, the seventh opening portion 827 into which the seventh flow path pipe 77 is inserted, and the eighth opening portion 828 into which the eighth flow path pipe 78 is inserted. Each of the plurality of opening portions 821 to 828 forms the other end of each of the plurality of inter-member flow paths 190.

Further, in the present embodiment, as shown in FIG. 8, the eight opening portions 821 to 828 are arranged in two rows along any one of a first straight line R1 and a second straight line R2 along the X direction. The first straight line R1 is positioned in the Y1 direction with respect to the second straight line R2. Specifically, the first opening portion 821, the fifth opening portion 825, the seventh opening portion 827, and the third opening portion 823 are arranged in one row along the first straight line R1 in this order from the X2 direction to the X1 direction. The second opening portion 822, the sixth opening portion 826, the eighth opening portion 828, and the fourth opening portion 824 are arranged in one row along the second straight line R2 in this order from the X2 direction to the X1 direction. As shown in FIG. 8, when viewed in the insertion direction DI, a quadrangle having the center of each of the first opening portion 821, the second opening portion 822, the third opening portion 823, and the fourth opening portion 824 as the apex is a parallelogram.

As shown in FIG. 6, each of the opening portions 821 to 828 of the present embodiment is formed by a sealing member **80*s* made of an elastic material such as an elastomer and a recess portion in which the sealing member 80*s* is accommodated. The recess portion in which the sealing member 80*s* is accommodated is provided on the coupling surface 820 of the pedestal portion 80 shown in FIGS. 10 and 11, and as shown in FIG. 6, and an opening coupled to the inter-member flow path 190 is formed at the bottom surface of the recess portion. In FIGS. 10 to 12, the sealing member 80*s* is omitted. The sealing member 80*s* has a substantially cylindrical shape in which a hole penetrating in the Z1 direction is formed. As shown in FIG. 7, when the flow path pipes 71 to 78 are inserted into the opening portions 821 to 828, respectively, the first flow path member 7 and the second flow path member 8 are liquid-tightly coupled to each other by bringing the outer peripheral surfaces of the insertion portions 715 to 785 of the flow path pipes 71 to 78 into contact with the inner peripheral surfaces of the plurality of sealing members 80***s*, respectively.

As shown in FIGS. 10 and 12, the flow path pipes 71 to 78 of the first flow path member 7 are formed at positions corresponding to the opening portions 821 to 828 of the second flow path member 8. Therefore, in the present embodiment, as shown in FIG. 9, the eight flow path pipes 71 to 78 provided in the first flow path member 7 are arranged in two rows along any of the first straight line R1 and the second straight line R2 along the X direction. As shown in FIG. 9, when viewed in the insertion direction DI, a quadrangle having the apex of each of the first flow path pipe 71, the second flow path pipe 72, the third flow path pipe 73, and the fourth flow path pipe 74 is a parallelogram.

As shown in FIGS. 10 and 12, the guide portions 81 to 84 are disposed in the direction opposite to the insertion direction DI with respect to the coupling surface 820. The guide portions 81 to 84 are subjected to positioning of the flow path structure body 50 and the flow path coupling member 60 of the liquid ejecting head 20 in the coupling operation of the first flow path member 7 with respect to the second flow path member 8. Specifically, the guide portions 81 to 84 restrict a relative movement in the vertical direction perpendicular to the insertion direction DI of the first flow path member 7 with respect to the second flow path member 8 in the coupling operation of the first flow path member 7 with respect to the second flow path member 8. In the present embodiment, the vertical direction perpendicular to the insertion direction DI is a direction along the XY plane. The guide portions 81 to 84 have guide surfaces 81*i* to 84*i* that are in contact with guided portions 711 to 741 provided in the flow path pipes 71 to 74 of the first flow path member 7. In the coupling operation, outer surfaces 711*s* to 741*s* of the guided portions 711 to 741 come into contact with the guide surfaces 81*i* to 84*i* of the guide portions 81 to 84, so that the relative movement in the vertical direction perpendicular to the insertion direction DI of the first flow path member 7 with respect to the second flow path member 8 is restricted. That is, the guided portions 711 to 741 are positioning members paired with the guide portions 81 to 84, and are used for positioning the flow path structure body 50 and the flow path coupling member 60 of the liquid ejecting head 20 in the coupling operation. Details of the guided portions 711 to 741 will be described later.

Further, as shown in FIGS. 11 and 12, the guide portions 81 to 84 restrict the relative movement of the first flow path member 7 with respect to the second flow path member 8 in the insertion direction DI. The guide portions 81 to 84 have end surfaces 81*t* to 84*t* that come into contact with the facing surface 70*b* of the base portion 70 of the first flow path member 7 by a coupling operation. In the coupling operation, the facing surface 70*b* of the base portion 70 comes into contact with the end surfaces 81*t* to 84*t*, so that the relative movement of the first flow path member 7 with respect to the second flow path member 8 in the insertion direction DI is restricted.

In the present embodiment, as shown in FIG. 9, the four guide portions 81 to 84 are provided in the second flow path member 8. The plurality of guide portions 81 to 84 are the first guide portion 81, the second guide portion 82, the third guide portion 83, and the fourth guide portion 84. The first guide portion 81 is formed to surround a portion of the first opening portion 821 from the side of the fifth outer surface fay. The second guide portion 82 is formed so to surround a portion of the second opening portion 822 from the side of the fifth outer surface fay. The third guide portion 83 is formed to surround a portion of the third opening portion 823 from the side of the first outer surface fa1. The fourth guide portion 84 is formed to surround a portion of the fourth opening portion 824 from the side of the first outer surface fa1. In the present embodiment, each of the shapes of the guide portions 81 to 84 is a semi-cylindrical shape surrounding a portion of the corresponding opening portions 821 to 824. As a result, the guide portions 81 to 84 can guide the guided portions 711 to 741 of the flow path pipes 71 to 74.

The formation number of the guide portions 81 to 84 is not limited thereto. The formation number of the guide portions 81 to 84 may be, for example, one, two, or five or more. Further, the formation positions of the guide portions 81 to 84 are not limited thereto. The guide portions 81 to 84 may be formed at positions at which the guided portions 711 to 741 can be guided, and may be formed to surround at least a portion of the other opening portions 825 to 828 such as the fifth opening portion 825, for example. Further, the shapes of the guide portions 81 to 84 may be any shape as long as the shapes can guide the guided portions 711 to 741, and may be, for example, a box shape or a plate shape.

As shown in FIGS. 10 and 12, each of the plurality of flow path pipes 71 to 78 provided in the first flow path member 7 includes either one of the guided portions 711 to 741 and support portions 751 to 781, and the insertion portions 715 to 785 inserted into the corresponding opening portions 821 to 828, respectively.

As shown in FIGS. 10 and 12, the insertion portions 715 to 785 are portions of the flow path pipes 71 to 78 that are inserted into the corresponding opening portions 821 to 828. In the present embodiment, the first flow path pipe 71 has the first insertion portion 715 inserted into the first opening portion 821. The second flow path pipe 72 has the second insertion portion 725 that is inserted into the second opening portion 822. The third flow path pipe 73 has the third insertion portion 735 inserted into the third opening portion 823. The fourth flow path pipe 74 has the fourth insertion portion 745 that is inserted into the fourth opening portion 824. The fifth flow path pipe 75 has the fifth insertion portion 755 inserted into the fifth opening portion 825. The sixth flow path pipe 76 has the sixth insertion portion 765 inserted into the sixth opening portion 826. The seventh flow path pipe 77 has the seventh insertion portion 775 to be inserted into the seventh opening portion 827. The eighth flow path pipe 78 has the eighth insertion portion 785 inserted into the eighth opening portion 828. In the present embodiment, the shapes of the insertion portions 715 to 785 are cylindrical shapes having the in-pipe flow paths 718 to 788 inside. The shape of the insertion portions 715 to 785 is not limited thereto, and any shape may be used as long as it can be inserted into the corresponding opening portions 821 to 828.

As shown in FIGS. 10 and 12, in the coupling operation, the guided portions 711 to 741 having the outer surfaces 711*s* to 741*s* that can come into contact with the guide surfaces 81*i* to 84*i* of the guide portions 81 to 84 are provided in the flow path pipes 71 to 74 formed at positions in which the guide portions 81 to 84 can be contacted. The guided portions 711 to 741 are disposed between the corresponding insertion portions 715 to 745 and the base portion 70. For the guided portions 711 to 741 in the coupled state, portions of the guided portions 711 to 741 are positioned between the corresponding insertion portions 715 to 745 and the corresponding guide portions 81 to 84 when viewed in the insertion direction DI. In the present embodiment, a dimension W1 of the guided portions 711 to 741 in the vertical direction perpendicular to the insertion direction DI is larger than a dimension W2 of the corresponding insertion portions 715 to 745 in the vertical direction perpendicular to the insertion direction DI. A distance L1 in the insertion direction DI from the end surfaces 81*t* to 84*t* of the guide portions 81 to 84 in the direction opposite to the insertion direction DI to the coupling surface 820 is larger than a dimension L2 of the corresponding insertion portions 715 to 745. The dimension L2 of the insertion portions 715 to 745 refers to the distance L2 in the insertion direction DI from coupling portions 717 to 747 between the insertion portions 715 to 745 respectively corresponding to the guide portions 81 to 84 and the guided portions 711 to 741, to tip end portions 715*p* to 745*p* of the insertion portions 715 to 745 in the insertion direction DI. That is, the length L1 from the end surfaces 81*t* to 84*t* of the guide portions 81 to 84 to the coupling surface 820 is longer than the length L2 of the insertion portions 715 to 745 along the insertion direction DI. As a result, the guided portions 711 to 741 are guided by the guide portions 81 to 84 before the insertion portions 715 to 745 are inserted into the corresponding opening portions 821 to 824 in the coupling operation. In the present embodiment, as shown in FIGS. 10 and 12, the shape of each of the guided portions 711 to 741 has a cylindrical shape, which is configured to engage with and come into contact with the corresponding guide portions 81 to 84, having the in-pipe flow paths 718 to 788 inside. The shapes of the guided portions 711 to 741 are not limited thereto, and may be any shape that is configured to engage with and come into contact with the corresponding guide portions 81 to 84.

As shown in FIGS. 10 and 12, the first flow path pipe 71 has the first guided portion 711 guided by the first guide portion 81. The first guided portion 711 has the first outer surface 711*s* that comes into contact with the guide surface 81*i* of the first guide portion 81. The second flow path pipe 72 has the second guided portion 721 guided by the second guide portion 82. The second guided portion 721 has the second outer surface 721*s* that comes into contact with the guide surface 82*i* of the second guide portion 82. The third flow path pipe 73 has the third guided portion 731 guided by the third guide portion 83. The third guided portion 731 has the third outer surface 731*s* that comes into contact with the guide surface 83*i* of the third guide portion 83. The fourth flow path pipe 74 has the fourth guided portion 741 guided by the fourth guide portion 84. The fourth guided portion 741 has the fourth outer surface 741*s* that comes into contact with the guide surface 84*i* of the fourth guide portion 84.

As shown in FIGS. 10 and 12, in the present embodiment, the dimension L2 of the insertion portions 715 to 785 and a dimension L3 of the guide portions 81 to 84 are the same, but the present disclosure is not limited thereto. The dimension L3 of the guide portions 81 to 84 referred to here refers to the distance L3 in the insertion direction DI from the end surfaces 81*t* to 84*t* of the guide portions 81 to 84 in the direction opposite to the insertion direction DI, to the coupling portions 817, 827, 837 and 847 between the guide portions 81 to 84 and the intermediate portion 89. The distance L1 in the insertion direction DI from the end surfaces 81*t* to 84*t* of the guide portions 81 to 84 to the coupling surface 820 may be larger than the dimension L2 of the corresponding insertion portions 715 to 745. Thus, for example, the dimension L3 of the guide portions 81 to 84 may be smaller than the dimension L2 of the corresponding insertion portions 715 to 745 along the insertion direction DI.

As shown in FIGS. 10 and 12, in the coupling operation, the support portions 751 to 781 instead of the guided portions 711 to 741 are provided in the flow path pipes 75 to 78 formed at positions in which the guide portions 81 to 84 are not provided. The support portions 751 to 781 are disposed between the corresponding insertion portions 755 to 785 and the base portion 70, and have outer surfaces 751*s* to 781*s*, respectively. In the present embodiment, the shapes of the support portions 751 to 781 are the same as the shapes of the guided portions 711 to 741. That is, the shapes of the support portions 751 to 781 are cylindrical shapes having the in-pipe flow paths 718 to 788 inside. A dimension W5 of the support portions 751 to 781 in the vertical direction perpendicular to the insertion direction DI is larger than the dimension W2 of the corresponding insertion portions 755 to 785 in the vertical direction perpendicular to the insertion direction DI. In other words, in the present embodiment, the diameter of the support portions 751 to 781 in the vertical direction perpendicular to the insertion direction DI is larger than the diameter of the corresponding insertion portions 755 to 785 in the vertical direction perpendicular to the insertion direction DI. The shapes of the support portions 751 to 781 are not limited thereto. For example, the dimension W5 of the support portions 751 to 785 in the vertical direction perpendicular to the insertion direction DI may be the same as the dimension W2 of the corresponding insertion portions 755 to 785 in the vertical direction perpendicular to the insertion direction DI.

As shown in FIG. 11, the fifth flow path pipe 75 comes into contact with the second flow path member 8 only by the fifth insertion portion 755 as a portion inserted into the fifth opening portion 825. The sixth flow path pipe 76 comes into contact with the second flow path member 8 only by the sixth insertion portion 765 inserted into the sixth opening portion 826 shown in FIG. 12. As shown in FIG. 11, the seventh flow path pipe 77 comes into contact with the second flow path member 8 only by the seventh insertion portion 775 inserted into the seventh opening portion 827. The eighth flow path pipe 78 comes into contact with the second flow path member 8 only by the eighth insertion portion 785 inserted into the eighth opening portion 828 shown in FIG. 12.

As shown in FIG. 9, the first flow path pipe 71, the second flow path pipe 72, the third flow path pipe 73, and the fourth flow path pipe 74 are flow path pipes guided by the guide portions 81 to 84. The fifth flow path pipe 75, the sixth flow path pipe 76, the seventh flow path pipe 77, and the eighth flow path pipe 78 are flow path pipes that are not guided by the guide portions 81 to 84. In other words, in the present embodiment, in the coupling operation, the guided portions 711 to 741 provided in the four flow path pipes 71 to 74 are guided by the corresponding guide portions 81 to 84, respectively, so that the flow path structure body 50 and the flow path coupling member 60 of the liquid ejecting head 20 are positioned.

Figure 13:
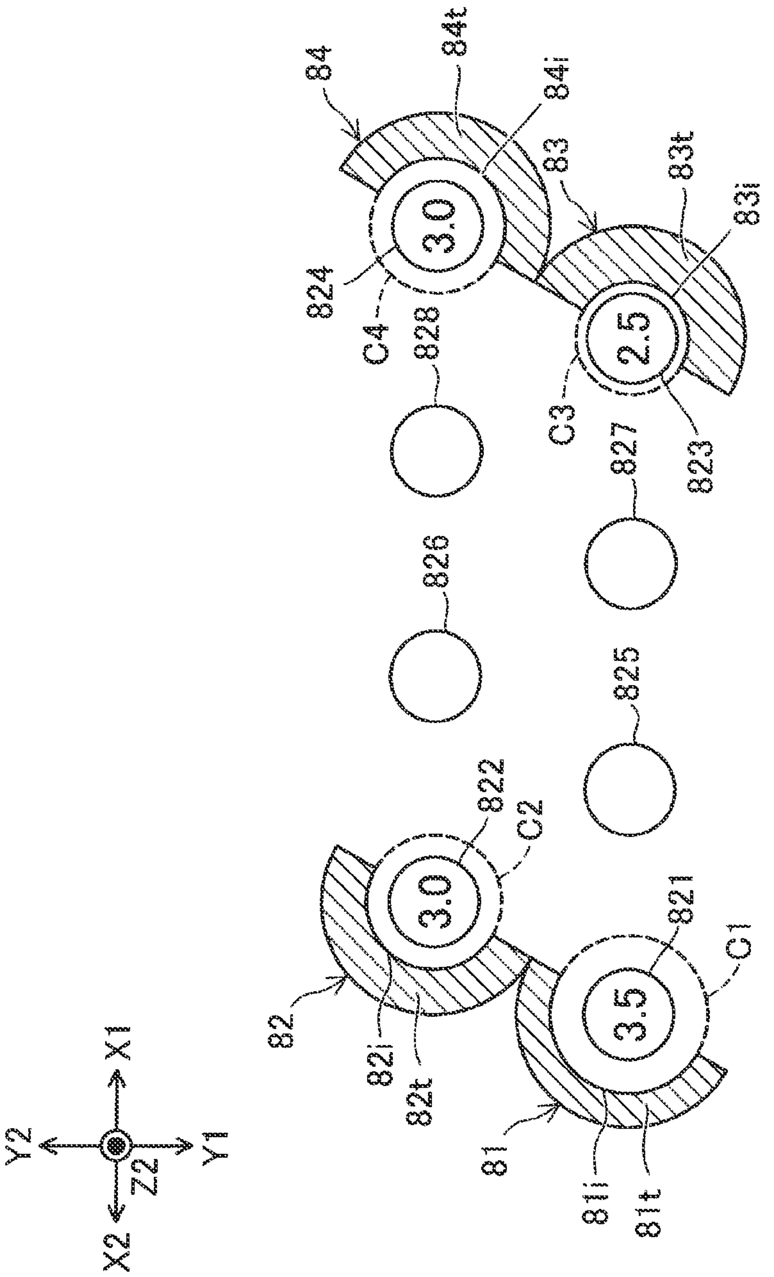
FIG. 13 is a view showing a cross-sectional shape of an opening portion and a guide portion in the first embodiment.

FIG. 13 is a view for describing the cross-sectional shapes of the opening portions 821 to 828 and the guide portions 81 to 84 in the first embodiment. FIG. 13 shows a state in which the flow path coupling member 60 is viewed from the same side of the second outer surface fa2 as in FIG. 8. Further, FIG. 13 shows virtual circles C1 to C4 formed by the guide surfaces 81*i* to 84*i* of the guide portions 81 to 84 having a semi-cylindrical shape with broken lines. At this time, the diameters of the virtual circles C1 to C4 correspond to the inner diameters of the guide portions 81 to 84. In FIG. 13, the ratio of the inner diameters of the guide portions 81 to 84 is represented by a numerical value.

In the present embodiment, the inner diameter of the second guide portion 82 and the inner diameter of the fourth guide portion 84 are the same.

That is, the shape and area of the virtual circle C2 related to the second guide portion 82 are the same as the shape and area of the virtual circle C4 related to the fourth guide portion 84. Further, the inner diameter of the first guide portion 81 is larger than the inner diameters of the second guide portion 82 and the fourth guide portion 84. In other words, the area of the virtual circle C1 related to the first guide portion 81 is larger than the area of the virtual circle C2 related to the second guide portion 82 and the area of the virtual circle C4 related to the fourth guide portion 84. That is, the shape of the virtual circle C1 related to the first guide portion 81 is different from the shape of the virtual circle C2 related to the second guide portion 82 and the shape of the virtual circle C4 related to the fourth guide portion 84. Further, the inner diameter of the third guide portion 83 is smaller than the inner diameters of the second guide portion 82 and the fourth guide portion 84. In other words, the area of the virtual circle C3 related to the third guide portion 83 is smaller than the area of the virtual circle C2 related to the second guide portion 82 and the area of the virtual circle C4 related to the fourth guide portion 84.

That is, the shape of the virtual circle C3 related to the third guide portion 83 is different from the shape of the virtual circle C2 related to the second guide portion 82 and the shape of the virtual circle C4 related to the fourth guide portion 84.

Figure 14:
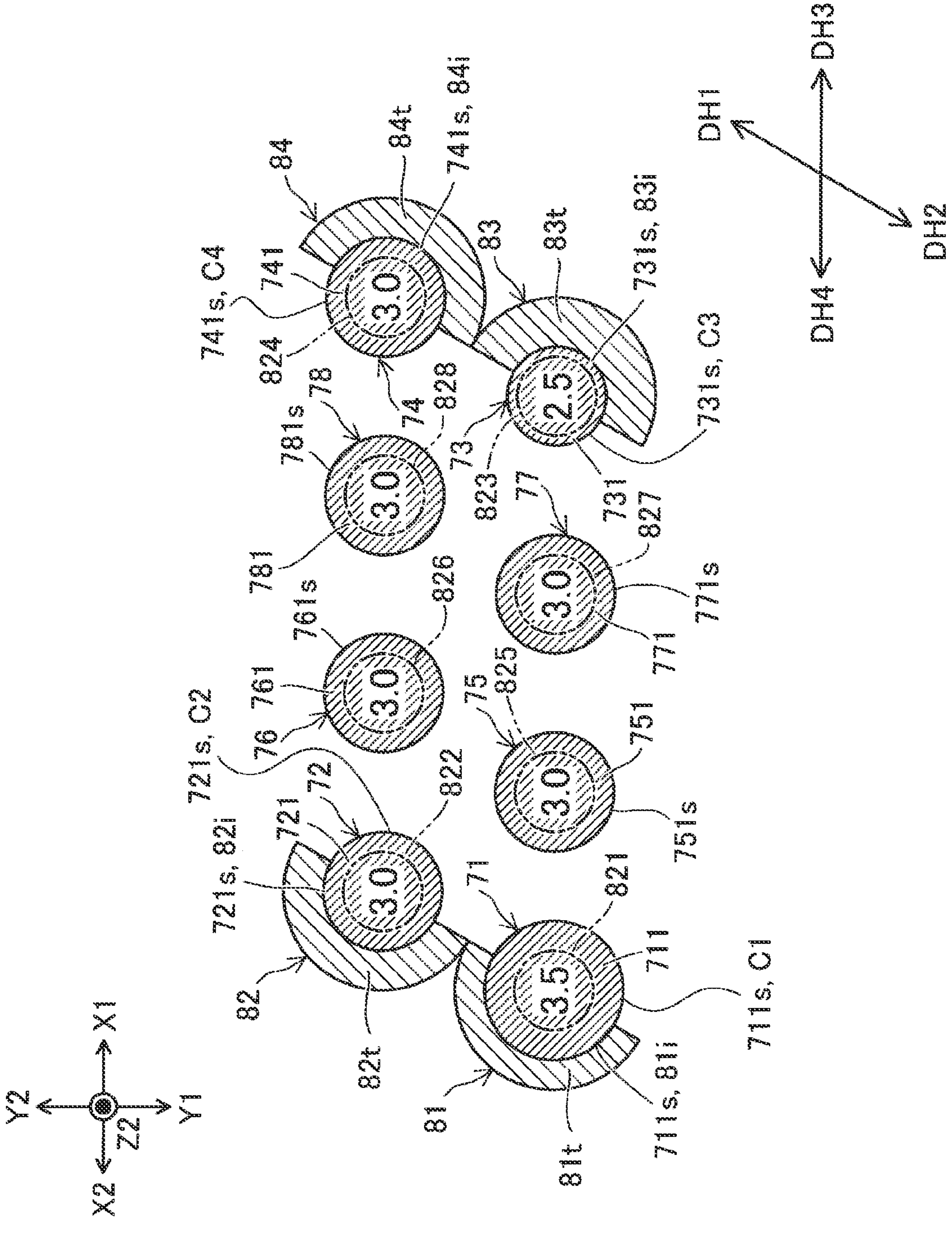
FIG. 14 is a view for describing a coupling aspect between the guide portion and a guided portion of the first embodiment.

FIG. 14 is a view for describing a cross-sectional shape of the guided portions 711 to 741 and a coupling aspect between the guide portions 81 to 84 and the guided portions 711 to 741 in the first embodiment. FIG. 14 shows a case where the coupling operation is performed correctly. The case where the coupling operation is correctly performed here refers to the case where the guided portions 711 to 741 are guided by the corresponding guide portions 81 to 84. FIG. 14 shows a state in which the guide portions 81 to 84 and the guided portions 711 to 741 are viewed from the same side of the second outer surface fa2 as in FIG. 9 in the coupled state. In FIG. 14, the shapes of the opening portions 821 to 828 are also shown by a two-dot chain line. In FIG. 14, the ratio of the cross-sectional areas of the guided portions 711 to 741 and the support portions 751 to 781 is represented by a numerical value.

In the present embodiment, the cross-sectional area of the second guided portion 721 in the vertical direction perpendicular to the insertion direction DI and the cross-sectional area of the fourth guided portion 741 in the vertical direction perpendicular to the insertion direction DI are the same. That is, the cross-sectional shape of the second guided portion 721 in the vertical direction perpendicular to the insertion direction DI is the same as the cross-sectional shape of the fourth guided portion 741 in the vertical direction perpendicular to the insertion direction DI. Further, the cross-sectional area of the first guided portion 711 in the vertical direction perpendicular to the insertion direction DI is larger than the cross-sectional area of the second guided portion 721 in the vertical direction perpendicular to the insertion direction DI and the cross-sectional area of the fourth guided portion 741 in the vertical direction perpendicular to the insertion direction DI. That is, the cross-sectional shape of the first guided portion 711 in the vertical direction perpendicular to the insertion direction DI is different from the cross-sectional shape of the second guided portion 721 in the vertical direction perpendicular to the insertion direction DI and the cross-sectional shape of the fourth guided portion 741 in the vertical direction perpendicular to the insertion direction DI. Further, the cross-sectional area of the third guided portion 731 in the vertical direction perpendicular to the insertion direction DI is smaller than the cross-sectional area of the second guided portion 721 in the vertical direction perpendicular to the insertion direction DI and the cross-sectional area of the fourth guided portion 741 in the vertical direction perpendicular to the insertion direction DI. That is, the cross-sectional shape of the third guided portion 731 in the vertical direction perpendicular to the insertion direction DI is different from the cross-sectional shape of the second guided portion 721 in the vertical direction perpendicular to the insertion direction DI and the cross-sectional shape of the fourth guided portion 741 in the vertical direction perpendicular to the insertion direction DI. The cross-sectional area of the guided portions 711 to 741 referred to here is an area of a region surrounded by an outer edge when the guided portions 711 to 741 are cut on a surface perpendicular to the insertion direction DI.

As shown in FIG. 14, when the coupling operation is performed correctly, that is, when the coupled state of the first flow path member 7 with respect to the second flow path member 8 is appropriate, the shape of each of the guide portions 81 to 84 matches the shape of each of the guided portions 711 to 741. In other words, when the coupling operation is performed correctly, the area of each of the virtual circles C1 to C4 related to the guide portions 81 to 84, and the cross-sectional area of each of the guided portions 711 to 741 in the vertical direction perpendicular to the insertion direction DI are substantially the same. Therefore, when the coupling operation is performed correctly, the guided portions 711 to 741 do not interfere with the guide portions 81 to 84, as shown in FIG. 10. While the guided portions 711 to 741 are guided by the guide portions 81 to 84, the guided portions 711 to 741 are guided in a state in which almost no gap is formed between the guide portions 81 to 84 and the guided portions 711 to 741. That is, while the guide surfaces 81*i* to 84*i* of the guide portions 81 to 84 and the outer surfaces 711*s* to 741*s* of the guided portions 711 to 741 are substantially in contact with each other, the flow path structure body 50 and the flow path coupling member 60 of the liquid ejecting head 20 are positioned.

Figure 15:
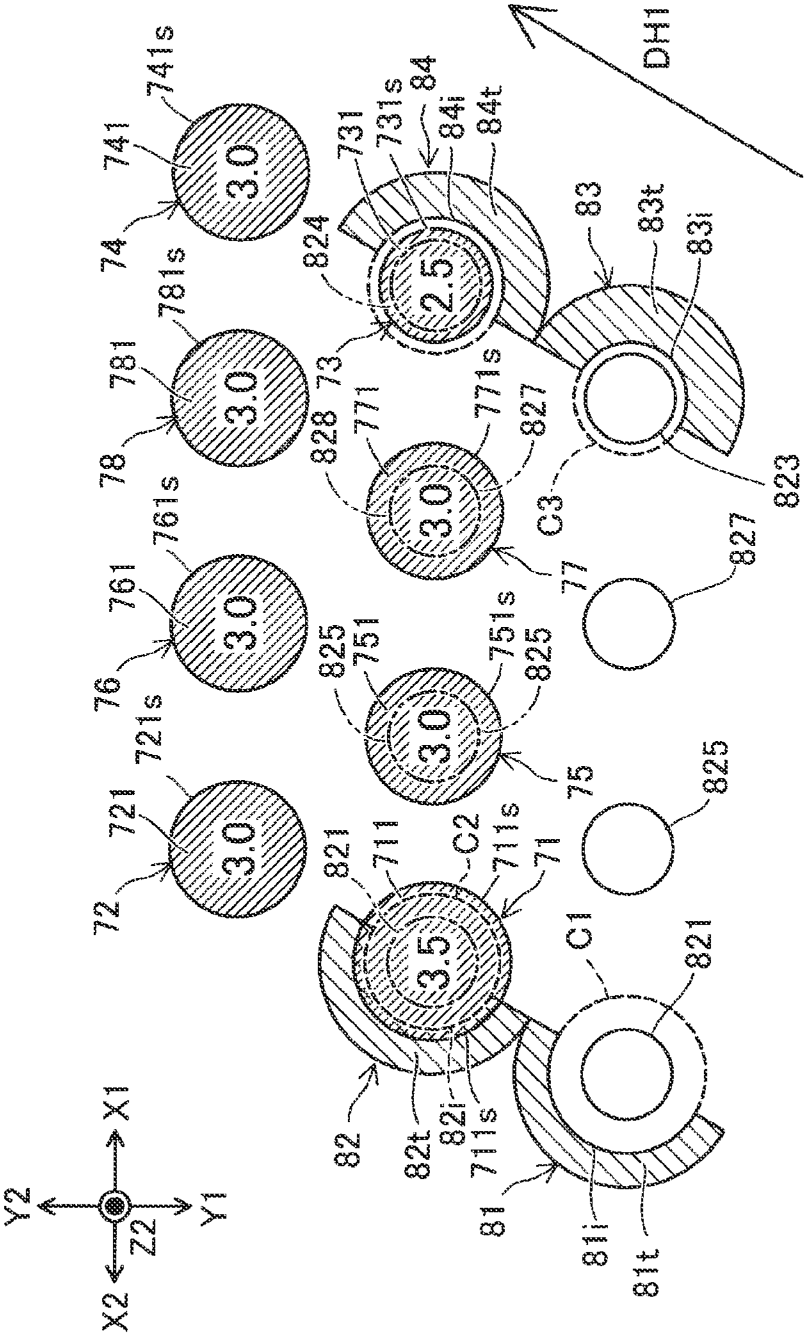
FIG. 15 is a view for describing an example of an aspect of preventing erroneous insertion in the first embodiment.

FIG. 15 is a view for describing an example of an aspect of preventing erroneous insertion in the first embodiment.

The erroneous insertion referred to here refers to the fact that the first flow path member 7 is coupled to the second flow path member 8 by a disposition different from the correct disposition shown in FIG. 14. That is, the erroneous insertion means that the first flow path member 7 is coupled to the second flow path member 8 in a state in which the first flow path member 7 is rotated by a predetermined angle around the Z-axis along the insertion direction DI from the correct disposition state, or that the first flow path member 7 is coupled to the second flow path member 8 in a state in which the first flow path member 7 is mispositioned with respect to the second flow path member 8. As an example of the erroneous insertion, FIG. 15 shows that the first flow path member 7 is coupled to the second flow path member 8 in a state in which the first flow path member 7 is mispositioned with respect to the second flow path member 8. Specifically, FIG. 15 shows, in a state in which the first flow path member 7 is mispositioned from the correct disposition shown in FIG. 14 along a first arrangement direction DH1, a case where each of the insertion portions 715 to 785 of the first flow path member 7 is to be inserted into each of the opening portions 821 to 828 of the second flow path member 8. As shown in FIG. 8, the first arrangement direction DH1 referred to here is a direction along the direction in which the first guide portion 81 and the adjacent guide portion 82 are aligned, and a direction from the side of the third outer surface fa3 to the side of the fourth outer surface fa4 in the coupled state. In the present embodiment, as shown in FIG. 15, the first arrangement direction DH1 is a direction along the direction in which the first guide portion 81 and the second guide portion 82 are aligned, and is a direction including the X1 direction component and the Y2 direction component. In FIG. 15, the ratio of the cross-sectional areas of the guided portions 711 to 741 and the support portions 751 to 781 is represented by a numerical value.

When the first flow path member 7 is to be coupled to the second flow path member 8 in a state in which the first flow path member 7 is mispositioned from the correct disposition along the first arrangement direction DH1, the first guided portion 711 is guided by the second guide portion 82, and the third guided portion 731 is guided by the fourth guide portion 84.

At this time, the cross-sectional area of the first guided portion 711 in the vertical direction perpendicular to the insertion direction DI is larger than the area of the virtual circle C2 related to the second guided portion 721. That is, the outer shape of the first guided portion 711 is larger than the inner diameter of the second guide portion 82. Therefore, when the coupling operation that relatively moves the first flow path member 7 with respect to the second flow path member 8 in the insertion direction DI is performed, the first guided portion 711 interferes with the second guide portion 82, so that the first flow path member 7 cannot be coupled to the second flow path member 8. Therefore, in a state in which the first flow path member 7 is mispositioned from the correct disposition along the first arrangement direction DH1, the first flow path member 7 can be prevented from being erroneously coupled to the second flow path member 8.

FIG. 16 is a table summarizing aspects of preventing the erroneous insertion in the first embodiment. As shown in FIGS. 14 and 16, when the first flow path member 7 is mispositioned from the correct disposition along a second arrangement direction DH2, the second guided portion 721 is guided by the first guide portion 81, and the fourth guided portion 741 is guided by the third guide portion 83. At this time, the cross-sectional area of the fourth guided portion 741 in the vertical direction perpendicular to the insertion direction DI is larger than the area of the virtual circle C3 related to the third guide portion 83. That is, the outer shape of the fourth guided portion 741 is larger than the inner diameter of the third guide portion 83. Therefore, when the coupling operation that relatively moves the first flow path member 7 with respect to the second flow path member 8 in the insertion direction DI is performed, the fourth guided portion 741 interferes with the third guide portion 83, so that the first flow path member 7 cannot be coupled to the second flow path member 8. Therefore, in a state in which the first flow path member 7 is mispositioned from the correct disposition along the second arrangement direction DH2, the first flow path member 7 can be prevented from being erroneously coupled to the second flow path member 8.

As shown in FIGS. 14 and 16, when the first flow path member 7 is mispositioned from the correct disposition along a third arrangement direction DH3, all of the plurality of guided portions 711 to 741 are not guided by the plurality of guide portions 81 to 84. Instead, the seventh support portion 771 is guided by the third guide portion 83, and the eighth support portion 781 is guided by the fourth guide portion 84. At this time, in the present embodiment, as shown in FIG. 14, the shape of the seventh support portion 771 of the seventh flow path pipe 77 and the shape of the eighth support portion 781 of the eighth flow path pipe 78 are the same as the shape of the second guided portion 721 of the second flow path pipe 72 and the shape of the fourth guided portion 741. In other words, the cross-sectional area of each of the seventh support portion 771 and the eighth support portion 781 in the vertical direction perpendicular to the insertion direction DI is the same as the cross-sectional area of each of the second guided portion 721 and the fourth guided portion 741 in the vertical direction perpendicular to the insertion direction DI. Therefore, the cross-sectional area of the seventh support portion 771 in the vertical direction perpendicular to the insertion direction DI is larger than the area of the virtual circle C3 related to the third guide portion 83. That is, the outer shape of the seventh support portion 771 is larger than the inner diameter of the third guide portion 83. Therefore, when the coupling operation that relatively moves the first flow path member 7 to the second flow path member 8 is performed, the seventh support portion 771 interferes with the third guide portion 83, so that the first flow path member 7 cannot be coupled to the second flow path member 8. Therefore, in a state in which the first flow path member 7 is mispositioned from the correct disposition along the third arrangement direction DH3, the first flow path member 7 can be prevented from being erroneously coupled to the second flow path member 8.

As shown in FIGS. 14 and 16, when the first flow path member 7 is rotated by 180° around the Z-axis along the insertion direction DI from the correct disposition, the first guided portion 711 is guided by the fourth guide portion 84. At this time, the cross-sectional area of the first guided portion 711 in the vertical direction perpendicular to the insertion direction DI is larger than the area of the virtual circle C1 related to the fourth guide portion 84. That is, the outer shape of the first guided portion 711 is larger than the inner diameter of the fourth guide portion 84. Therefore, when the coupling operation that relatively moves the first flow path member 7 with respect to the second flow path member 8 in the insertion direction DI is performed, the first guided portion 711 interferes with the fourth guide portion 84, so that the first flow path member 7 cannot be coupled to the second flow path member 8. Therefore, the first flow path member 7 can be prevented from being erroneously coupled to the second flow path member 8 in a state in which the first flow path member 7 is inverted around the Z-axis along the insertion direction DI from the correct disposition.

As shown in FIGS. 14 and 16, in a state in which the first guided portion 711 is guided by the first guide portion 81, a case where the first flow path member 7 is rotated around the Z-axis along the insertion direction DI from the correct disposition will be described. In this case, the guided portions 721 to 741 other than the first guided portion 711 interfere with the guide portions 82 to 84 other than the first guide portion 81. Therefore, in this case, the first flow path member 7 cannot be coupled to the second flow path member 8. Therefore, in a state in which the first flow path member 7 is rotated around the Z-axis along the insertion direction DI from the correct disposition, the first flow path member 7 can be prevented from being erroneously coupled to the second flow path member 8.

According to the first embodiment, as shown in FIGS. 10 and 12, the guide portions 81 to 84 are disposed in the direction opposite to the insertion direction DI with respect to the coupling surface 820. The guided portions 711 to 741 are disposed between the corresponding insertion portions 715 to 745 and the base portion 70. A distance L1 in the insertion direction DI from the end surfaces 81*t* to 84*t* of the guide portions 81 to 84 in the direction opposite to the insertion direction DI to the coupling surface 820 is larger than a dimension L2 of the corresponding insertion portions 715 to 745. As a result, in the coupling operation of the first flow path member 7 with respect to the second flow path member 8, the guided portions 711 to 741 can be guided by the guide portions 81 to 84 before the insertion portions 715 to 785 are inserted into the opening portions 821 to 828. That is, according to the first embodiment, in order to position the flow path structure body 50 and the flow path coupling member 60 of the liquid ejecting head 20, it is not necessary to provide a positioning member at a position different from the flow path pipes 71 to 78 through which the liquid flows. Therefore, the first flow path member 7 and the second flow path member 8 can be miniaturized in both directions of the insertion direction DI of the first flow path member 7 with respect to the second flow path member 8 and the vertical direction perpendicular to the insertion direction DI. As a result, the flow path structure body 50 and the flow path coupling member 60 can be miniaturized in the three-dimensional directions of the X direction, the Y direction, and the Z direction.

Further, according to the first embodiment, as shown in FIGS. 11 and 12, in the coupling operation, the base portion 70 brings the facing surface 70*b* into contact with the end surfaces 81*t* to 84*t* of the guide portion 81, so that it is possible to restrict the relative movement of the first flow path member 7 with respect to the second flow path member 8 in the insertion direction DI. As a result, the insertion amount of the first flow path member 7 with respect to the second flow path member 8 when the coupling operation is performed can be defined.

Further, according to the first embodiment, as shown in FIGS. 10 and 12, the guide portions 81 to 84 and the base portion 70 provided for positioning serve to define the insertion amount of the first flow path member 7 with respect to the second flow path member 8 when the coupling operation is performed. Therefore, it is not necessary to separately provide a member to define the insertion amount of the first flow path member 7 with respect to the second flow path member 8 when the coupling operation is performed. As a result, it is possible to suppress an increase in size of the first flow path member 7 and the second flow path member 8 in the vertical direction perpendicular to the insertion direction DI of the first flow path member 7 with respect to the second flow path member 8.

Further, according to the first embodiment, as shown in FIGS. 10 and 14, in the coupling operation, the guide portions 81 to 84 can restrict the relative movement of the first flow path member 7 with respect to the second flow path member 8 in the vertical direction perpendicular to the insertion direction DI.

Further, according to the first embodiment, as shown in FIGS. 10 and 12, portions of the guided portions 711 to 741 are positioned between the corresponding insertion portions 715 to 745 and the corresponding guide portions 81 to 84 when viewed in the insertion direction DI. As a result, the possibility that the tip end portions 715*p* to 745*p* of the insertion portions 715 to 745 touch the guide portions 81 to 84 during the coupling operation can be reduced.

Further, according to the first embodiment, as shown in FIGS. 10 and 12, the plurality of flow path pipes 71 to 78 protrude from the one base portion 70 in the insertion direction DI. As a result, as shown in FIG. 2, the plurality of flow path pipes 71 to 78 can be integrally moved. Therefore, the coupling operation between the first flow path member 7 and the second flow path member 8 can be smoothly performed.

Further, according to the first embodiment, as shown in FIG. 14, the cross-sectional area of the second guided portion 721 in the vertical direction perpendicular to the insertion direction DI is smaller than the cross-sectional area of the third guided portion 731 in the vertical direction perpendicular to the insertion direction DI. Further, the cross-sectional area of the third guided portion 731 in the vertical direction perpendicular to the insertion direction DI is smaller than the cross-sectional area of the first guided portion 711 in the vertical direction perpendicular to the insertion direction DI. That is, the cross-sectional shape of the first guided portion 711 in the vertical direction perpendicular to the insertion direction DI, the cross-sectional shape of the second guided portion 721 in the vertical direction perpendicular to the insertion direction DI, and the cross-sectional shape of the third guided portion 731 in the vertical direction perpendicular to the insertion direction DI are different from each other. As a result, as shown in FIG. 16, it is possible to suppress the first flow path member 7 from being coupled to the second flow path member 8 by a disposition different from the correct disposition shown in FIG. 14. In other words, the erroneous insertion of the first flow path member 7 with respect to the second flow path member 8 can be reduced.

Further, according to the first embodiment, as shown in FIGS. 11 and 14, the plurality of flow path pipes 71 to 78 include the flow path pipes 75 to 78 that come into contact with the second flow path member 8 only by the insertion portions 755 to 785 as portions inserted into the corresponding opening portions 825 to 828 in the coupled state. As shown in FIG. 16, even when the flow path pipes 75 to 78 that are not guided by the guide portions 81 to 84 among the plurality of flow path pipes 71 to 78 are included, the erroneous insertion of the first flow path member 7 with respect to the second flow path member 8 can be reduced. That is, the guide portions 81 to 84 may be only formed for one or more flow path pipes 71 to 78 among the plurality of flow path pipes 71 to 78, and the erroneous insertion of the first flow path member 7 with respect to the second flow path member 8 can be reduced without forming the guide portions 81 to 84 for all of the plurality of flow path pipes 71 to 78.

Further, according to the first embodiment, as shown in FIGS. 10 and 12, the distance L1 in the insertion direction DI from the end surfaces 81*t* to 84*t* of the guide portions 81 to 84 in the direction opposite to the insertion direction DI to the coupling surface 820 is larger than the dimension L2 of the corresponding insertion portions 715 to 745. As a result, even when the first flow path member 7 is mispositioned with respect to the second flow path member 8, the possibility that the tip end portions 715*p* to 785*p* of the insertion portions 715 to 785 come into contact with the coupling surface 820 can be reduced. Therefore, when the tip end portions 715*p* to 785*p* of the insertion portions 715 to 785 come into contact with the coupling surface 820, it is possible to suppress the ink as a liquid from adhering to the coupling surface 820. As a result, when the first ink flows into the flow paths 190, 718 to 788 through which the second ink, which is different from the first ink, flows, it is possible to suppress the induced color mixing or the increase of the consumption of the ink.

Further, according to the first embodiment, as shown in FIG. 14, the four guide portions 81 to 84 are provided in the second flow path member 8. As a result, the positioning accuracy of the first flow path member 7 with respect to the second flow path member 8 can be improved.

Further, according to the first embodiment, as shown in FIG. 14, the guided portions 711 to 741 are respectively formed at the first flow path pipe 71, the second flow path pipe 72, the third flow path pipe 73, and the fourth flow path pipe 74 disposed on the side of the end portions among the plurality of flow path pipes 71 to 78. In other words, the flow path pipes 71 to 74 positioned at both ends in the longitudinal direction of the convex polygon including the plurality of flow path pipes 71 to 74, that is, in the arrangement direction of the flow path pipes 71 to 78 along the X direction, are provided with the guided portions 711 to 741 to perform positioning. In this way, for example, in the coupling operation of the first flow path member 7 with respect to the second flow path member 8, the correct disposition can be easily visually recognized, so that the positioning accuracy can be further improved.

B. Second Embodiment

Figure 17:
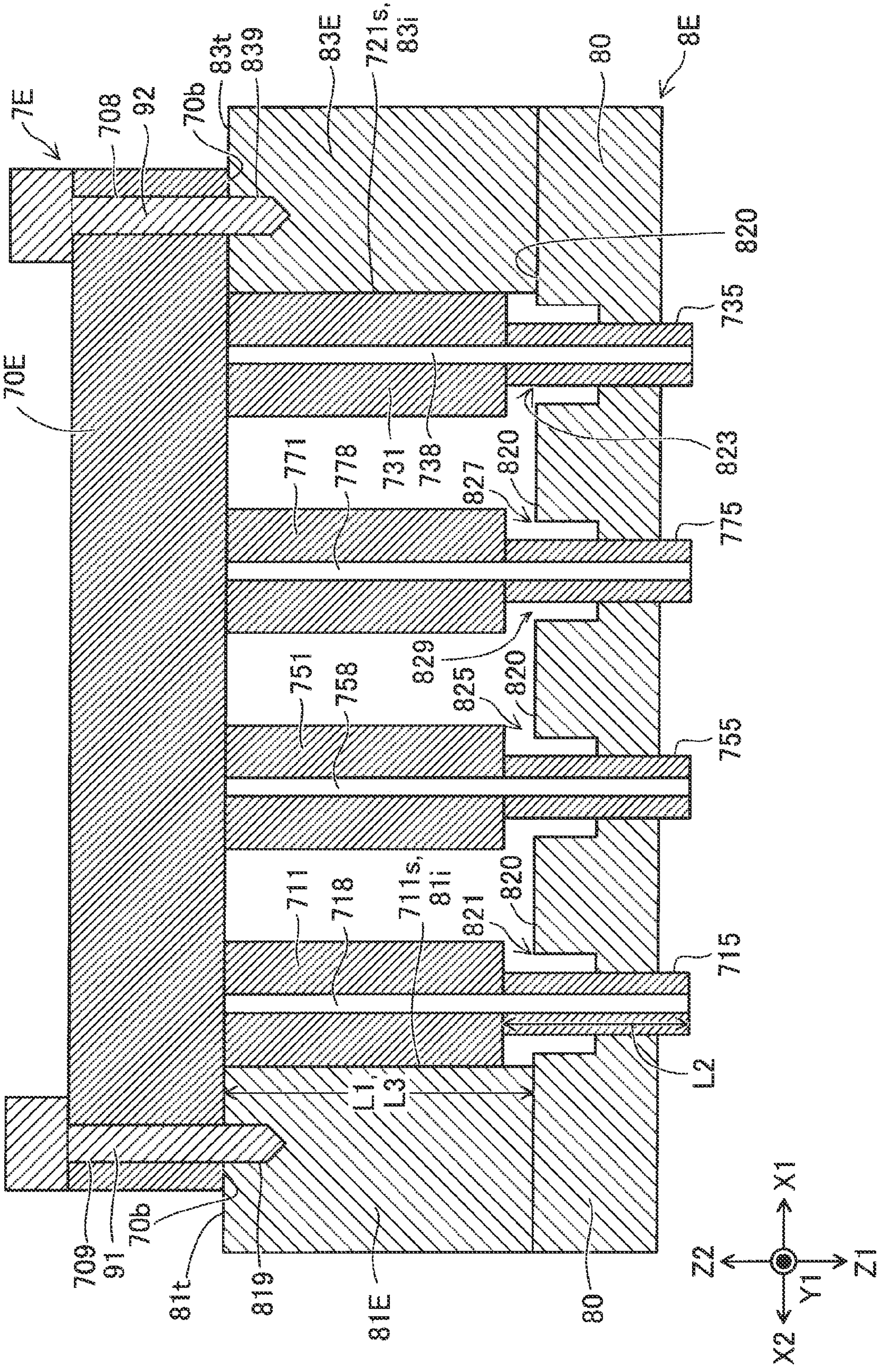
FIG. 17 is a view showing a configuration of a first flow path member and a second flow path member in a second embodiment.

FIG. 17 is a view showing a configuration of a first flow path member 7E and a second flow path member 8E in the second embodiment. FIG. 17 shows the first flow path member 7E and the second flow path member 8E in a coupled state in which the first flow path member 7E is coupled to the second flow path member 8E. In the present embodiment, a configuration in which the first flow path member 7E can be fixed to the second flow path member 8E after the coupling operation of the first flow path member 7E with respect to the second flow path member 8E is correctly performed, will be described. The same configurations as those in the first embodiment will be given the same reference numerals, and the description thereof will be omitted.

In the first embodiment, as shown in FIGS. 10 and 12, the guide portions 81 to 84 are disposed in the direction opposite to the insertion direction DI with respect to the coupling surface 820 without directly protruding from the coupling surface 820, but the present disclosure is not limited thereto. Guide portions 81E to 84E of the present embodiment shown in FIG. 17 protrude from the coupling surface 820 in the direction opposite to the insertion direction DI. That is, the guide portions 81E to 84E are integrally formed with the coupling surface 820. In such a form, the coupling surface 820 having the opening portions 821 to 828 into which the insertion portions 715 to 785 are inserted is integrally formed with the guide portions 81 to 84, so that the positioning accuracy of the first flow path member 7E with respect to the second flow path member 8E can be further improved. Further, in such a form, the first flow path member 7E and the second flow path member 8E can be miniaturized in the insertion direction DI of the first flow path member 7E with respect to the second flow path member 8.

Further, in the first embodiment, as shown in FIGS. 10 and 12, the intermediate portion 89 is disposed between the guide portions 81 to 84 and the coupling surface 820, but the present disclosure is not limited thereto. The second flow path member 8E of the present embodiment shown in FIG. 17 does not include the intermediate portion 89. That is, each of the guide surfaces 81*i* to 84*i* is continuous along the Z2 direction from the coupling surface 820 to the end surfaces 81*t* to 84*t*. In other words, the guide portions 81E to 84E are provided in the range from the coupling surface 820 to the end surfaces 81*t* to 84*t*. Therefore, the distance L1 in the insertion direction DI from the end surfaces 81*t* to 84*t* of the guide portions 81E to 84E in the direction opposite to the insertion direction DI to the coupling surface 820 is larger than the dimension L2 of the corresponding insertion portions 715 to 785. Further, the dimension L3 and the distance L1 of the guide portions 81E to 84E of the present embodiment are the same. The dimension L3 of the guide portions 81E to 84E referred to here refers to the distance L3 in the insertion direction DI from the end surfaces 81*t* to 84*t* of the guide portions 81E to 84E in the direction opposite to the insertion direction DI to the coupling surface 820. That is, the dimension L3 of the guide portions 81E to 84E of the present embodiment is larger than the dimension L2 of the insertion portions 715 to 785.

Further, in the present embodiment, after the coupling operation of the first flow path member 7E with respect to the second flow path member 8E is correctly performed, a base portion 70E and the guide portions 81E and 83E are fixed by fixing members 91 and 92. The fixing members 91 and 92 referred to here are, for example, screws and pins. When the fixing members 91 and 92 are pins, for example, a spring or the like that bias the pins in the fixing direction may be provided. In the present embodiment, the fixing direction is the same direction as the insertion direction DI and is a direction along the Z1 direction. The base portion 70 has base side fixing holes 708 and 709 through which the fixing members 91 and 92 are inserted. The guide portions 81E and 83E have guide side fixing holes 819 and 839 to receive the fixing members 91 and 92. When the fixing members 91 and 92 are screws, for example, screw grooves may be formed in the base side fixing holes 708 and 709 and the guide side fixing holes 819 and 839, respectively. The types and fixing positions of the fixing members 91 and 92 are not limited thereto. The base portion 70E and the guide portions 81E and 83E may be fixed at one place by, for example, the fixing members 91 and 92, or may be fixed at three or more places. Further, it is not essential that the base portion 70E and the guide portions 81E and 83E are fixed by the fixing members 91 and 92.

According to the second embodiment, as shown in FIG. 17, the fixing holes 708, 709, 819, and 839 to receive the fixing members 91 and 92 are formed in the guide portions 81E and 83E and the base portion 70E, respectively. That is, the guide portions 81E and 83E and the base portion 70E provided for positioning are also used as fixing positions and also serve as fixed members. Therefore, the first flow path member 7E can be fixed to the second flow path member 8E without separately providing a fixing position for fixing the fixing members 91 and 92. As a result, the first flow path member 7E and the second flow path member 8E can be miniaturized in the vertical direction perpendicular to the insertion direction DI of the first flow path member 7E with respect to the second flow path member 8E.

Further, according to the second embodiment, as shown in FIG. 17, after the coupling operation of the first flow path member 7E with respect to the second flow path member 8E is correctly performed, the base portion 70E and the guide portions 81E and 83E can be fixed by the fixing members 91 and 92. As a result, it is possible to prevent the coupling between the first flow path member 7E and the second flow path member 8E from being unintentionally decoupled.

C. Third Embodiment

Figure 18:
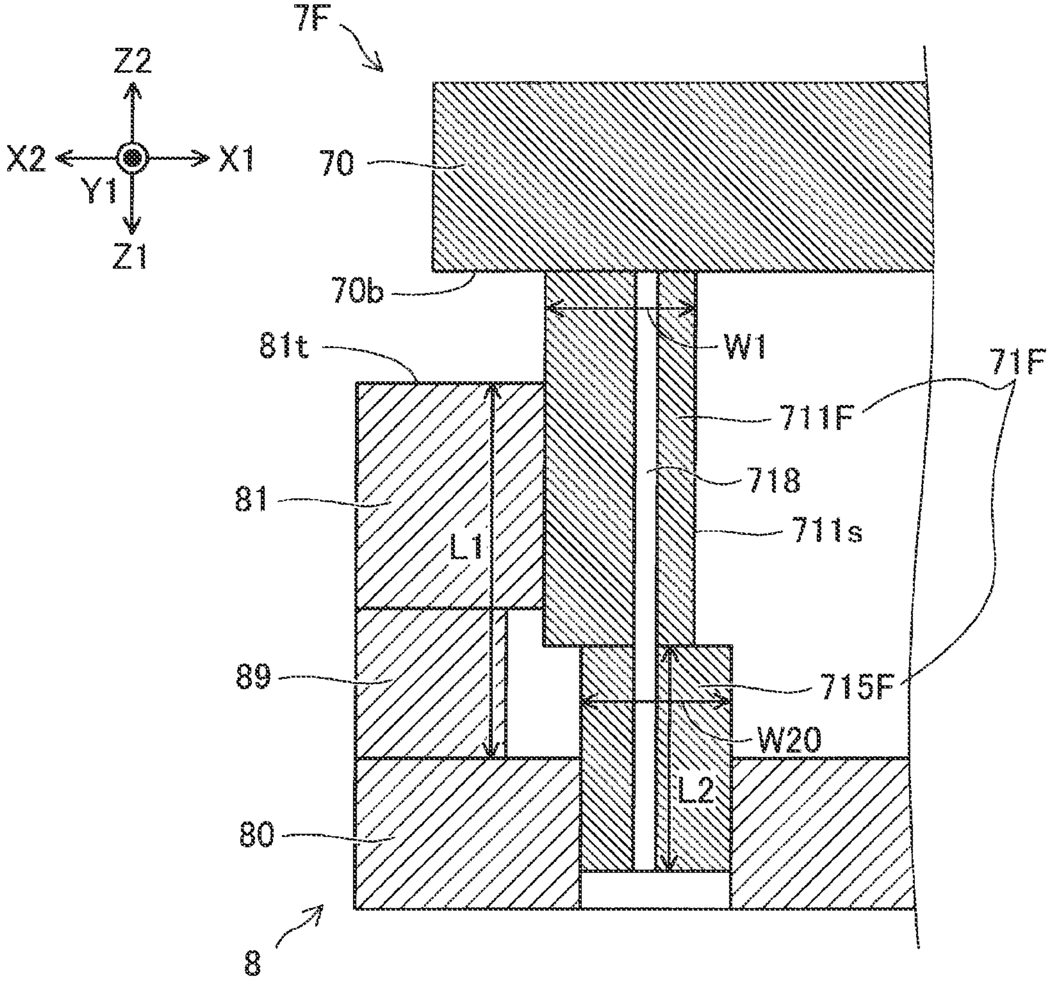
FIG. 18 is a view showing a configuration of a first flow path member and a second flow path member in a third embodiment.
Figure 19:
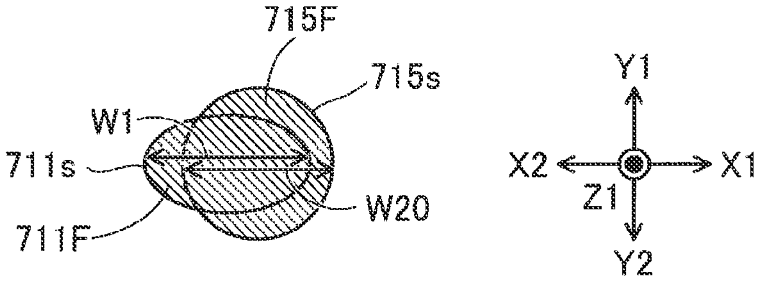
FIG. 19 is a view showing a cross-sectional shape of a first guided portion and a first insertion portion in the third embodiment.

FIG. 18 is a view showing a configuration of the first flow path member 7F and the second flow path member 8 in the third embodiment. In FIG. 18, in the first flow path member 7F and the second flow path member 8, the vicinity of the first flow path pipe 71F and the first guide portion 81 is excerpted and shown. FIG. 19 is a view showing a cross-sectional shape of each of a first guided portion 711F and a first insertion portion 715F in the third embodiment. FIG. 19 shows a state in which the first guided portion 711F and the first insertion portion 715F are seen through from the side of the tip end portion 715*p* of the first insertion portion 715F. In FIG. 19, the illustration of the in-pipe flow path 718 is omitted. In the present embodiment, a portion of the configuration of the first guided portion 711F and the first insertion portion 715F is different from the configuration of the first embodiment. The same configurations as those in the first embodiment will be given the same reference numerals, and the description thereof will be omitted.

In the first embodiment, as shown in FIGS. 10 and 12, the guided portions 711 to 741 are formed such that the dimension W1 of the guided portions 711 to 741 in the direction perpendicular to the insertion direction DI is larger than the dimension W2 of the corresponding insertion portions 715 to 745 in the vertical direction perpendicular to the insertion direction DI. On the other hand, in the present embodiment, as shown in FIG. 18, the dimension W1 of the first guided portion 711F in the vertical direction perpendicular to the insertion direction DI and a dimension W20 of the first insertion portion 715F in the vertical direction perpendicular to the insertion direction DI are the same. The cross-sectional area of the first guided portion 711 in the vertical direction perpendicular to the insertion direction DI is smaller than the cross-sectional area of the first insertion portion 715 in the vertical direction perpendicular to the insertion direction DI. Even in such a form, a portion of the first guided portion 711F is positioned between the first insertion portion 715F and the first guide portion 81 when viewed in the insertion direction DI, so that during the coupling operation, the possibility that the tip end portion 715*p* of the first insertion portion 715F touches the first guide portion 81 can be reduced. The second flow path pipe 72, the third flow path pipe 73, and the fourth flow path pipe 74 may also have the same configuration as the first flow path pipe 71F in the present embodiment.

D. Fourth Embodiment

Figure 20:
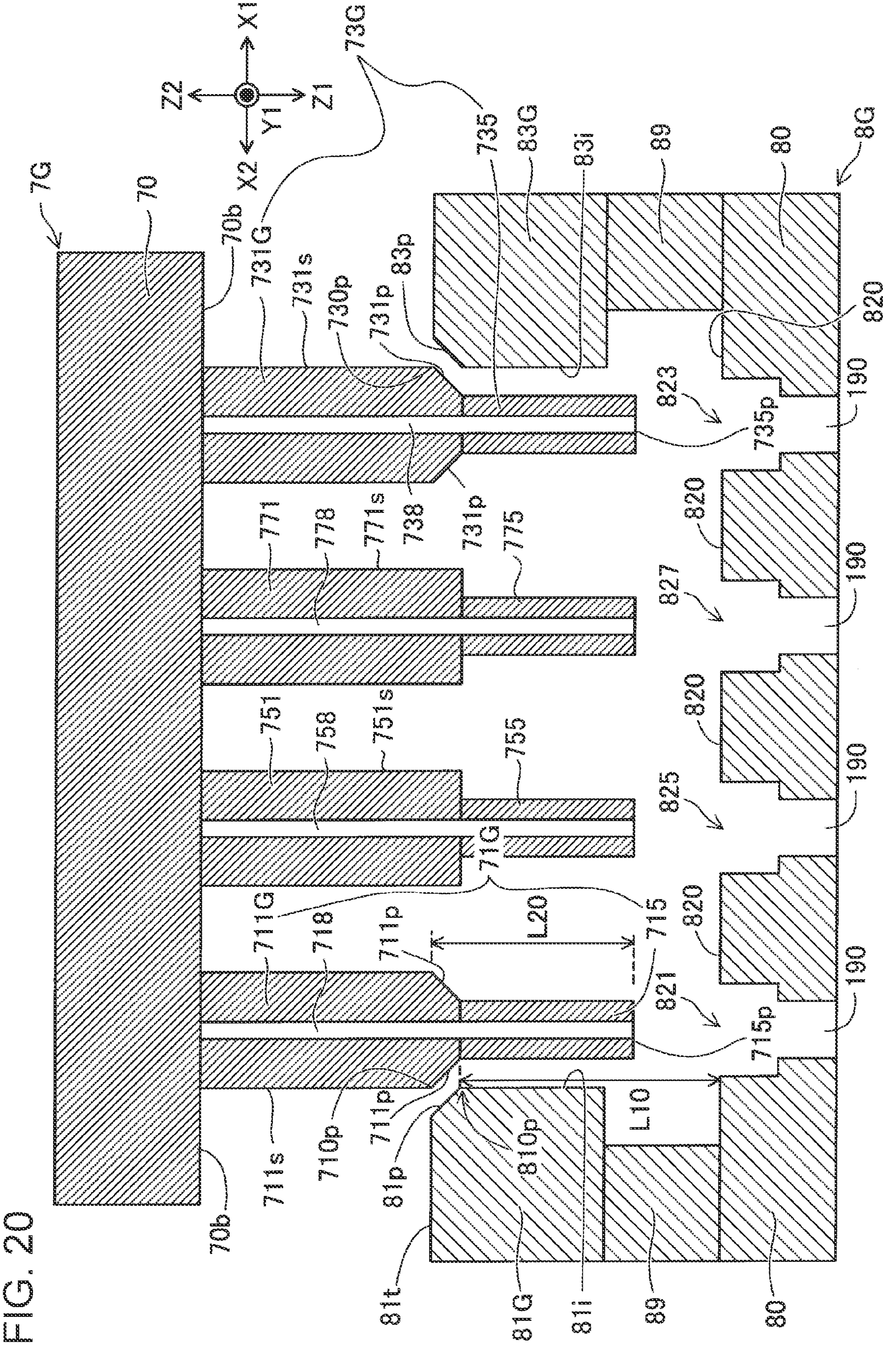
FIG. 20 is a view showing a configuration of a first flow path member and a second flow path member in a fourth embodiment.

FIG. 20 is a view showing a configuration of a first flow path member 7G and a second flow path member 8G in the fourth embodiment. FIG. 20 shows a state immediately after starting the coupling operation of the first flow path member 7G with respect to the second flow path member 8G. In the present embodiment, a portion of the shape of guided portions 711G and 731G and a portion of the shape of guide portions 81G and 82G are different from the shapes of the first embodiment. The same configurations as those in the first embodiment will be given the same reference numerals, and the description thereof will be omitted.

In the present embodiment, a first flow path pipe 71G includes a guided portion side first tapering portion 711*p* that is disposed between the first guided portion 711G and the first insertion portion 715, and of which the cross-sectional area in the vertical direction perpendicular to the insertion direction DI is gradually reduced from the first guided portion 711G toward the first insertion portion 715. Further, a third flow path pipe 73G includes a guided portion side second tapering portion 731*p* that is disposed between the third guided portion 731G and the third insertion portion 735, and of which the cross-sectional area in the vertical direction perpendicular to the insertion direction DI is gradually reduced from the third guided portion 731G toward the third insertion portion 735. The guided portion side first tapering portion 711*p* and the guided portion side second tapering portion 731*p* are tapering portions formed between the guided portion 711 and 731 and the insertion portions 715 and 735, respectively. In the following, the boundary portions between the outer surfaces 711*s* and 713*s* and the guided portion side tapering portions 711*p* and 731*p* will be referred to as guided portion side boundary portions 710*p* and 730*p*.

As shown in FIG. 20, the first guide portion 81G includes a guide portion side first tapering portion 81*p* that is disposed at a coupling portion between the end surface 81*t* and the guide surface 81*i*, and of which the cross-sectional area in the vertical direction perpendicular to the insertion direction DI is gradually reduced from the guide surface 81*i* toward the end surface 81*t*. The third guide portion 83G includes a guide portion side second tapering portion 83*p* that is disposed at a coupling portion between the end surface 83*t* and the guide surface 83*i*, and of which the cross-sectional area in the vertical direction perpendicular to the insertion direction DI is gradually reduced from the guide surface 83*i* toward the end surface 83*t*. The guide portion side first tapering portion 81*p* and the guide portion side second tapering portion 83*p* are tapering portions formed at the coupling portions between the guide surfaces 81*i* and 83*i* and the end surfaces 81*t* and 83*t*, respectively. In the following, the boundary portions between the guide surfaces 81*i* and 83*i* and the guide portion side tapering portions 81*p* and 83*p* are referred to as guide portion side boundary portions 810*p* and 830*p*.

As shown in FIG. 20, when the tapering portions 81*p*, 83*p*, 710*p*, and 730*p* are provided on at least one of the guide portions 81 and 83 and the guided portions 711 and 731 as in the present embodiment, it is preferable to set each of distances L10 and L20 as follows. It is preferable that the distance L10 in the insertion direction DI from the guide portion side boundary portions 810*p* and 830*p* to the coupling surface 820 is larger than the distance L20 in the insertion direction DI from the guided portion side boundary portions 710*p* and 730*p* to the tip end portions 715*p* and 735*p* of the insertion portions 715 and 735. In this way, in the coupling operation, before the insertion portions 715 and 735 are inserted into the corresponding opening portions 821 and 823, it is possible for the guided portions 711G and 731G provided with the guided portion side tapering portions 711*p* and 731*p* to be guided by the guide portions 81G and 83G.

According to the above embodiment, the flow path pipes 71G and 73G include the portions 710*p* and 730*p* that are disposed between the guided portions 711G and 731G and the insertion portions 715 and 735, and of which the cross-sectional area perpendicular to the insertion direction DI is gradually reduced from the guided portions 711G and 731G toward the insertion portions 715 and 735. In this way, by providing the guided portion side tapering portions 711*p* and 731*p* in the flow path pipes 71 and 73, it is possible to facilitate contact between the guide portions 81G and 83G and the guided portions 711G and 731G in the coupling operation of the first flow path member 7G with respect to the second flow path member 8G. That is, by providing the tapering portions between the guided portions 711G and 731G and the insertion portions 715 and 735, the insertability of the first flow path member 7G with respect to the second flow path member 8G can be improved.

According to the above embodiments, the guide portions 81G and 83G include the portions 81*p* and 83*p* that are disposed at the coupling portions between the end surfaces 81*t* and 83*t* and the guide surfaces 81*i* and 83*i*, and of which the cross-sectional area is gradually reduced in the vertical direction perpendicular to the insertion direction DI from the guide surfaces 81*i* and 83*i* toward the end surfaces 81*t* and 83*t*. In this way, by providing the guide portion side tapering portions 81*p* and 83*p* at the positions corresponding to the guided portion side tapering portions 711*p* and 731*p* provided on the flow path pipes 71G and 73G, it is possible to facilitate the contact between the guide portions 81G and 83G and the guided portions 711G and 731G in the coupling operation. That is, the insertability of the first flow path member 7G with respect to the second flow path member 8G can be further improved by providing the tapering portions at the positions corresponding to the guided portion side tapering portions 711*p* and 731*p* in the guide portions 81G and 83G in the coupling operation.

The guide portion side tapering portions 81*p* and 83*p* shown in FIG. 20 are not essential components, and the liquid ejecting apparatus 1 may not have, for example, the guide portion side tapering portions 81*p* and 83*p*, and may have only the guided portion side tapering portions 711*p* and 731*p*. Further, in the example shown in FIG. 20, the guided portion side tapering portions 711*p* and 731*p* are provided in the first flow path pipe 71G and the third flow path pipe 73G, respectively, but the present disclosure is not limited thereto. The second flow path pipe 72 and the fourth flow path pipe 74 guided by the guide portions 82 and 84 shown in FIG. 12 may also have the same configuration as the first flow path pipe 71G and the third flow path pipe 73G in the present embodiment.

E. Fifth Embodiment

Figure 21:
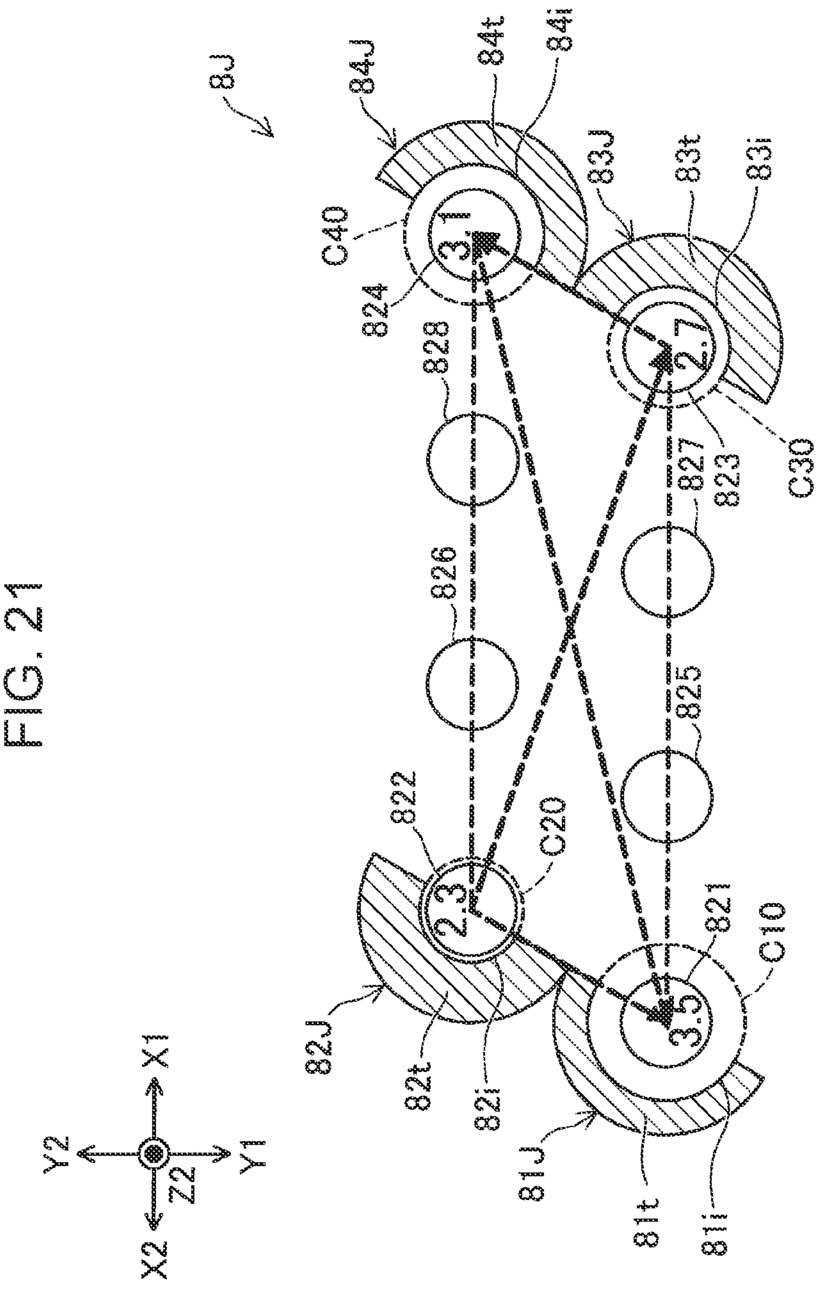
FIG. 21 is a view for describing cross-sectional shapes of an opening portion and a guide portion according to a fifth embodiment.

FIG. 21 is a view for describing the cross-sectional shapes of the opening portions 821 to 828 and guide portions 81J to 84J in the fifth embodiment. FIG. 21 shows a state in which the flow path coupling member 60 in the present embodiment is viewed from the same side of the second outer surface fa2 as in FIG. 13. Further, FIG. 21 shows virtual circles C10, C20, C30, and C40 formed by the guide surfaces 81*i* to 84*i* of the guide portions 81J to 84J having a semi-cylindrical shape with broken lines. At this time, the diameters of the virtual circles C10, C20, C30, and C40 correspond to the inner diameters of the guide portions 81J to 84J. In FIG. 21, the ratio of the inner diameters of the guide portions 81J to 84J is represented by a numerical value. The shape of each of the guide portions 81J to 84J is a semi-cylindrical shape that surrounds a portion of the corresponding opening portions 821 to 824, as in the first embodiment.

In the present embodiment, as shown in FIG. 21, the inner diameter of the first guide portion 81J, the inner diameter of the second guide portion 82J, the inner diameter of the third guide portion 83J, and the inner diameter of the fourth guide portion 84J are different from each other. Specifically, the inner diameter of the second guide portion 82J is smaller than the inner diameter of the third guide portion 83. In other words, the area of the virtual circle C20 related to the second guide portion 82J is smaller than the area of the virtual circle C30 related to the third guide portion 83J. That is, the shape of the virtual circle C20 related to the second guide portion 82J is different from the shape of the virtual circle C30 related to the third guide portion 83J. Further, the inner diameter of the third guide portion 83J is smaller than the inner diameter of the fourth guide portion 84J. In other words, the area of the virtual circle C30 related to the third guide portion 83J is smaller than the area of the virtual circle C40 related to the fourth guide portion 84J. That is, the shape of the virtual circle C30 related to the third guide portion 83J is different from the shape of the virtual circle C40 related to the fourth guide portion 84J. Further, the inner diameter of the fourth guide portion 84J is smaller than the inner diameter of the first guide portion 81J. In other words, the area of the virtual circle C40 related to the fourth guide portion 84J is smaller than the area of the virtual circle C10 related to the first guide portion 81J. That is, the shape of the virtual circle C40 related to the fourth guide portion 84J is different from the shape of the virtual circle C10 related to the first guide portion 81J.

Figure 22:
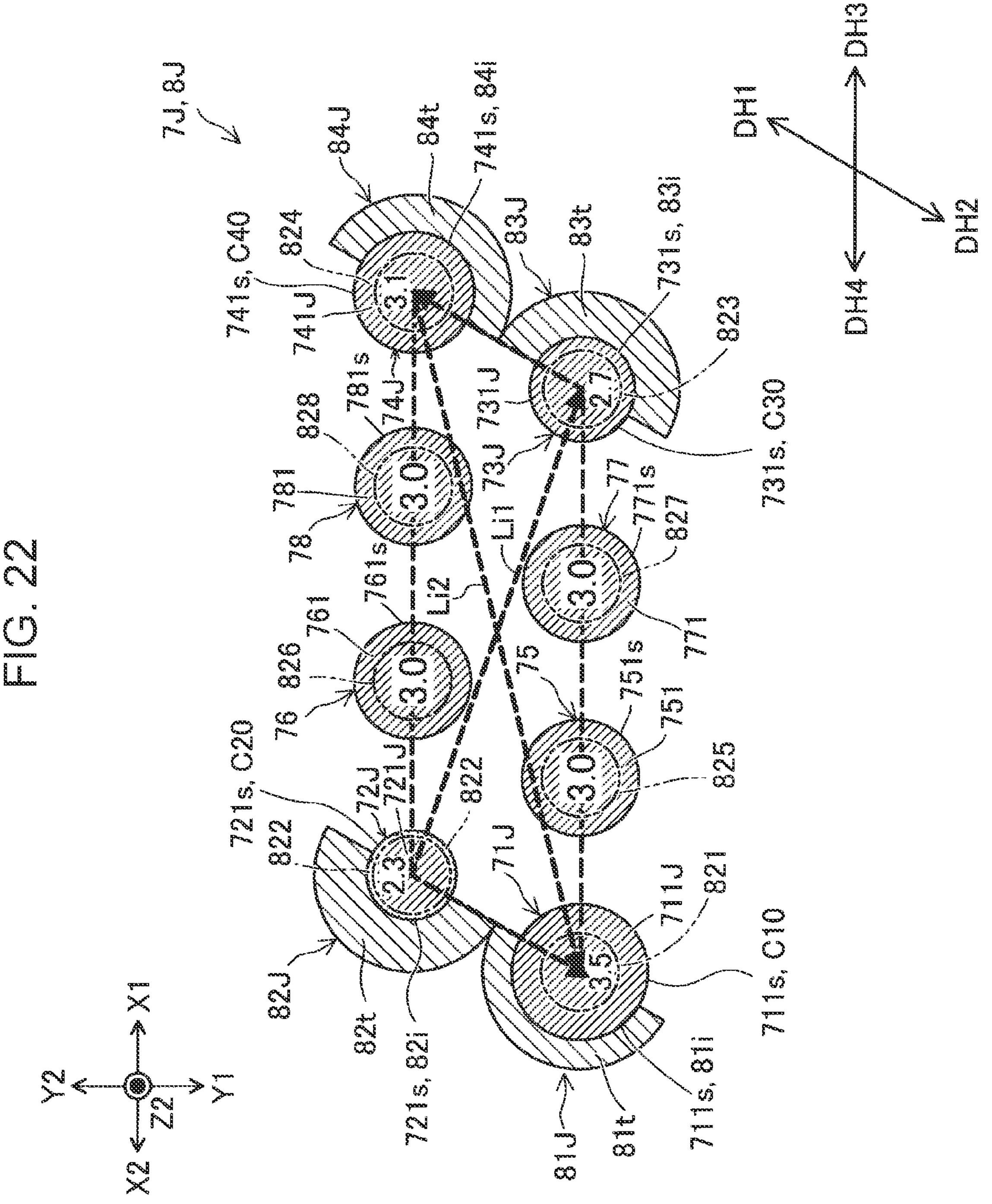
FIG. 22 is a view for describing a coupling aspect between the guide portion and a guided portion according to the fifth embodiment.

FIG. 22 is a view for describing a cross-sectional shape of guided portions 711J to 741J and a coupling aspect between the guide portions 81J to 84J and the guided portions 711J to 741J in the fifth embodiment. FIG. 22 shows a case where the coupling operation is correctly performed, as in FIG. 14. FIG. 22 shows a state in which the guide portions 81J to 84J and the guided portions 711J to 741J are viewed from the same side of the second outer surface fa2 as in FIG. 14 in the coupled state. In FIG. 22, the shapes of the opening portions 821 to 828 are also shown by a two-dot chain line. In FIG. 22, the ratio of the cross-sectional areas of the guided portions 711J to 741J and support portions 751J to 781 is represented by a numerical value.

Each of the guided portions 711J to 741J and each of the insertion portions 715 to 785 has a cylindrical shape as in the first embodiment.

In the present embodiment, the cross-sectional area of the second guided portion 721J in the vertical direction perpendicular to the insertion direction DI is smaller than the cross-sectional area of the third guided portion 731J in the vertical direction perpendicular to the insertion direction DI. Further, the cross-sectional area of the third guided portion 731J in the vertical direction perpendicular to the insertion direction DI is smaller than the cross-sectional area of the fourth guided portion 741J in the vertical direction perpendicular to the insertion direction DI. Further, the cross-sectional area of the fourth guided portion 741J in the vertical direction perpendicular to the insertion direction DI is smaller than the cross-sectional area of the first guided portion 711J in the vertical direction perpendicular to the insertion direction DI.

That is, the cross-sectional shapes of the first guided portion 711J, the second guided portion 721J, the third guided portion 731J, and the fourth guided portion 741J in the vertical direction perpendicular to the insertion direction DI are different from each other. Therefore, in the present embodiment, the cross-sectional shapes of the guide portions 81J to 84J and the guided portions 711J to 741J are different from the cross-sectional shapes in the first embodiment shown in FIGS. 13 and 14. Other components are the same as in the first embodiment. The same configurations as those in the first embodiment will be given the same reference numerals, and the description thereof will be omitted.

In the present embodiment, as shown in FIG. 22, when viewed in the insertion direction DI, a first line segment Li1 linking the second guided portion 721J to the third guided portion 731J intersects a second line segment Li2 linking the fourth guided portion 741J to the first guided portion 711J. The first line segment Li1 is a line segment that links the second guided portion 721J having the smallest cross-sectional area in the vertical direction perpendicular to the insertion direction DI, to the third guided portion 731J having the small cross-sectional area next to the second guided portion 721J in the vertical direction perpendicular to the insertion direction DI. Further, the second line segment Li2 is a line segment that links the first guided portion 711J having the largest cross-sectional area in the vertical direction perpendicular to the insertion direction DI, to the fourth guided portion 741J having the large cross-sectional area next to the first guided portion 711J in the vertical direction perpendicular to the insertion direction DI.

Further, in the present embodiment, as shown in FIG. 22, when viewed in the insertion direction DI, a quadrangle having the apex of each of the first flow path pipe 71J, the second flow path pipe 72J, the third flow path pipe 73J, and the fourth flow path pipe 74J is a rectangle and a parallelogram. In other words, when viewed in the insertion direction DI, the smallest convex polygon that surrounds the first guided portion 711J, the second guided portion 721J, the third guided portion 731J, and the fourth guided portion 741J is a parallelogram.

As shown in FIG. 22, when the coupling operation is performed correctly, that is, when the coupled state of the first flow path member 7J with respect to the second flow path member 8J is appropriate, the shape of each of the guide portions 81J to 84J matches the shape of each of the guided portions 711J to 741J. In other words, when the coupling operation is performed correctly, the area of each of the virtual circles C10, C20, C30, and C40 related to the guide portions 81J to 84J and the cross-sectional area of each of the guided portions 711J to 741J in the vertical direction perpendicular to the insertion direction DI are substantially the same. Therefore, when the coupling operation is performed correctly, the guided portions 711J to 741J do not interfere with the guide portions 81J to 84J as shown in FIG. 22. While the guided portions 711J to 741J are guided by the guide portions 81J to 84J, the guided portions 711J to 741J are guided in a state in which almost no gap is formed between the guide portions 81J to 84J and the guided portions 711J to 741J. That is, while the guide surfaces 81*i* to 84*i* of the guide portions 81J to 84J and the outer surfaces 711*s* to 741*s* of the guided portions 711J to 741J are substantially in contact with each other, the flow path structure body 50 and the flow path coupling member 60 of the liquid ejecting head 20 are positioned.

Figure 23:
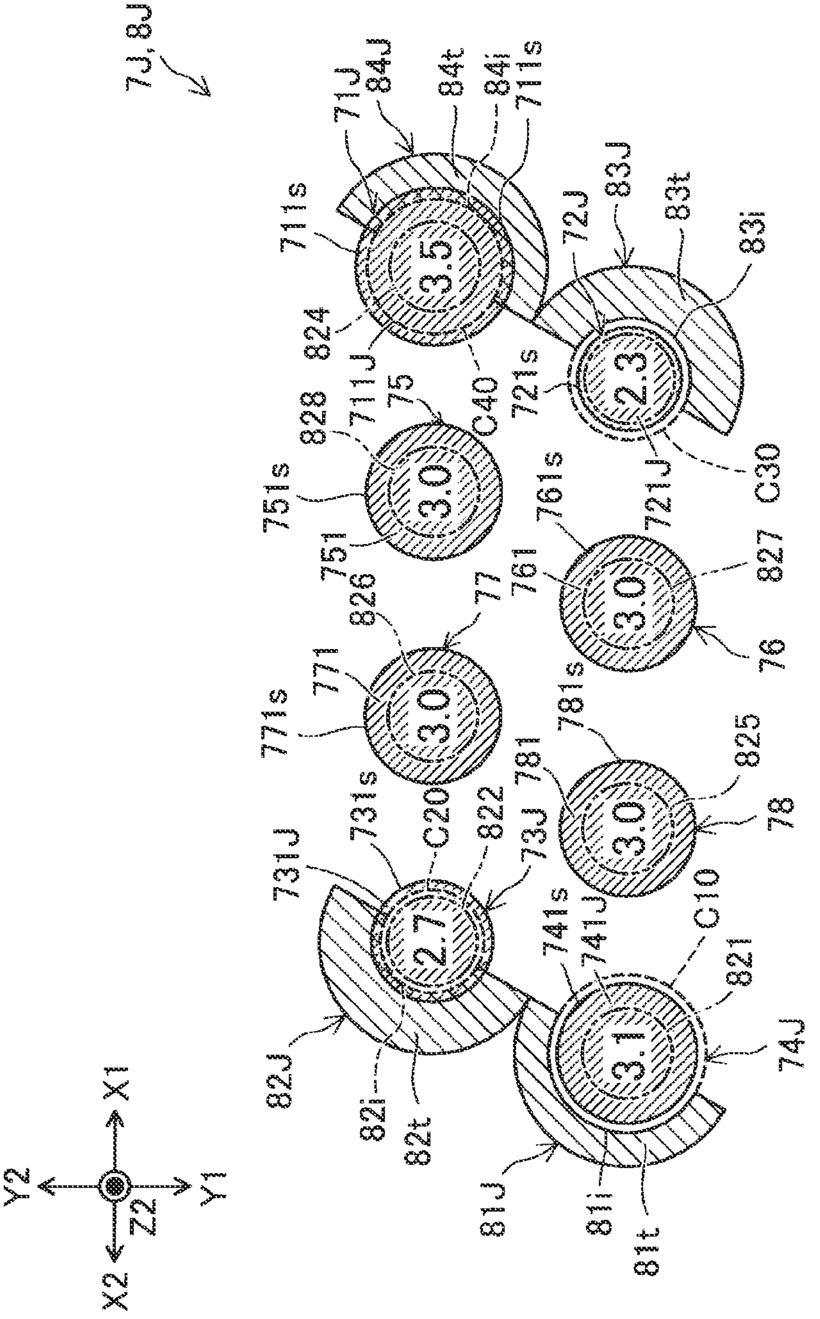
FIG. 23 is a view for describing an example of an aspect of preventing erroneous insertion in the fifth embodiment.

FIG. 23 is a view for describing an example of an aspect of preventing erroneous insertion in the fifth embodiment.

In FIG. 23, as an example of the erroneous insertion, a case is shown in which the first flow path member 7J is to be coupled to the second flow path member 8J in a state in which the first flow path member 7J is rotated by 180° around the Z-axis along the insertion direction DI from the correct disposition shown in FIG. 22. That is, in FIG. 23, in a state in which the first flow path member 7J is inverted around the Z-axis along the insertion direction DI from the correct disposition, a case is shown in which each of the insertion portions 715 to 785 of the first flow path member 7J is to be inserted into each of the opening portions 821 to 828 of the second flow path member 8J. In FIG. 23, the ratio of the cross-sectional areas of the guided portions 711J to 741J and the support portions 751J to 781 is represented by a numerical value.

When the first flow path member 7J is to be coupled to the second flow path member 8J in a state in which the first flow path member 7J is rotated by 180° around the Z-axis along the insertion direction DI from the correct disposition, the third guided portion 731J is guided by the second guide portion 82J. At this time, the cross-sectional area of the third guided portion 731J in the vertical direction perpendicular to the insertion direction DI is larger than the area of the virtual circle C20 related to the second guide portion 82J. That is, the outer shape of the third guided portion 731J is larger than the inner diameter of the second guide portion 82J. Therefore, when the coupling operation that relatively moves the first flow path member 7J with respect to the second flow path member 8J in the insertion direction DI is performed, the third guided portion 731J interferes with the second guide portion 82J.

Further, in a state in which the first flow path member 7J is rotated by 180° around the Z-axis along the insertion direction DI from the correct disposition, when the first flow path member 7J is to be coupled to the second flow path member 8J, the first guided portion 711J is guided by the fourth guide portion 84J. At this time, the cross-sectional area of the first guided portion 711J in the vertical direction perpendicular to the insertion direction DI is larger than the area of the virtual circle C40 related to the fourth guide portion 84J. That is, the outer shape of the first guided portion 711J is larger than the inner diameter of the fourth guide portion 84J. Therefore, when the coupling operation that relatively moves the first flow path member 7J with respect to the second flow path member 8J in the insertion direction DI is performed, the first guided portion 711J interferes with the fourth guide portion 84J. As a result, the first flow path member 7J cannot be coupled to the second flow path member 8J. Therefore, in a state in which the first flow path member 7J is inverted around the Z-axis along the insertion direction DI from the correct disposition, the first flow path member 7J can be prevented from being erroneously coupled to the second flow path member 8J.

FIG. 24 is a table summarizing aspects of preventing the erroneous insertion in the fifth embodiment. As shown in FIGS. 22 and 24, when the first flow path member 7J is mispositioned from the correct disposition along the first arrangement direction DH1, the first guided portion 711J is guided by the second guide portion 82J, and the third guided portion 731J is guided by the fourth guide portion 84J. At this time, the cross-sectional area of the first guided portion 711J in the vertical direction perpendicular to the insertion direction DI is larger than the area of the virtual circle C20 related to the second guide portion 82J. That is, the outer shape of the first guided portion 711J is larger than the inner diameter of the second guide portion 82J. Therefore, when the coupling operation that relatively moves the first flow path member 7J with respect to the second flow path member 8J in the insertion direction DI is performed, the first guided portion 711J interferes with the second guide portion 82J, so that the first flow path member 7J cannot be coupled to the second flow path member 8J. Therefore, in a state in which the first flow path member 7J is mispositioned from the correct disposition along the first arrangement direction DH1, the first flow path member 7J can be prevented from being erroneously coupled to the second flow path member 8J.

As shown in FIGS. 22 and 24, when the first flow path member 7J is mispositioned from the correct disposition in the second arrangement direction DH2, the second guided portion 721J is guided by the first guide portion 81J.

The fourth guided portion 741J is guided by the third guide portion 83J. At this time, the cross-sectional area of the fourth guided portion 741J in the vertical direction perpendicular to the insertion direction DI is larger than the area of the third guide portion 83J related to the virtual circle C30. That is, the outer shape of the fourth guided portion 741J is larger than the inner diameter of the third guide portion 83J. Therefore, when the coupling operation that relatively moves the first flow path member 7J with respect to the second flow path member 8J in the insertion direction DI is performed, the fourth guided portion 741J interferes with the third guide portion 83J, so second flow path member 8J. Therefore, in a state in which the first flow path member 7J is mispositioned from the correct disposition along the second arrangement direction DH2, the first flow path member 7J can be prevented from being erroneously coupled to the second flow path member 8J.

As shown in FIGS. 22 and 24, when the first flow path member 7J is mispositioned from the correct disposition in the third arrangement direction DH3, the seventh support portion 771 is guided by the third guide portion 83J and the eighth support portion 781 is guided by the fourth guide portion 84J. At this time, the cross-sectional area of the seventh support portion 771 in the vertical direction perpendicular to the insertion direction DI is larger than the area of the virtual circle C30 related to the third guide portion 83J. That is, the outer shape of the seventh support portion 771 is larger than the inner diameter of the third guide portion 83J. Therefore, when the coupling operation that relatively moves the first flow path member 7J with respect to the second flow path member 8J in the insertion direction DI is performed, the seventh support portion 771 interferes with the third guide portion 83J, so second flow path member 8J. Therefore, in a state in which the first flow path member 7J is mispositioned from the correct disposition along the third arrangement direction DH3, the first flow path member 7J can be prevented from being erroneously coupled to the second flow path member 8J.

As shown in FIGS. 22 and 24, when the first flow path member 7J is mispositioned from the correct disposition in the fourth arrangement direction DH4, the fifth support portion 751 is guided by the first guide portion 81J, and the sixth support portion 761 is guided by the second guide portion 82J. At this time, the cross-sectional area of the sixth support portion 761 in the vertical direction perpendicular to the insertion direction DI is larger than the area of the virtual circle C20 related to the second guide portion 82J. That is, the outer shape of the sixth support portion 761 is larger than the inner diameter of the second guide portion 82J.

Therefore, when the coupling operation that relatively moves the first flow path member 7J with respect to the second flow path member 8J in the insertion direction DI is performed, the sixth support portion 761 interferes with the second guide portion 82J, so that the first flow path member 7J cannot be coupled to the second flow path member 8J. Therefore, in a state in which the first flow path member 7J is mispositioned from the correct disposition along the fourth arrangement direction DH4, the first flow path member 7J can be prevented from being erroneously coupled to the second flow path member 8J.

As shown in FIGS. 22 and 24, when the first flow path member 7 is inverted from the correct disposition and is mispositioned in the first arrangement direction DH1, the fourth guided portion 741J is guided by the second guide portion 82J. At this time, the cross-sectional area of the fourth guided portion 741J in the vertical direction perpendicular to the insertion direction DI is larger than the area of the virtual circle C20 related to the second guide portion 82J. That is, the outer shape of the fourth guided portion 741J is larger than the inner diameter of the second guide portion 82J. Therefore, when the coupling operation that relatively moves the first flow path member 7J with respect to the second flow path member 8J in the insertion direction DI is performed, the fourth guided portion 741J interferes with the second guide portion 82J, so that the first flow path member 7J cannot be coupled to the second flow path member 8J. Therefore, in a state in which the first flow path member 7J is inverted from the correct disposition and then mispositioned along the first arrangement direction DH1, the first flow path member 7J can be prevented from being erroneously coupled to the second flow path member 8J.

As shown in FIGS. 22 and 24, when the first flow path member 7 is inverted from the correct disposition and is mispositioned in the second arrangement direction DH2, the first guided portion 711J is guided by the third guide portion 83J. At this time, the cross-sectional area of the first guided portion 711J in the vertical direction perpendicular to the insertion direction DI is larger than the area of the virtual circle C30 related to the third guide portion 83J. That is, the outer shape of the first guided portion 711J is larger than the inner diameter of the third guide portion 83J. Therefore, when the coupling operation that relatively moves the first flow path member 7J with respect to the second flow path member 8J in the insertion direction DI is performed, the first guided portion 711J interferes with the third guide portion 83J, so second flow path member 8J. Therefore, in a state in which the first flow path member 7J is inverted from the correct disposition and then mispositioned along the second arrangement direction DH2, the first flow path member 7J can be prevented from being erroneously coupled to the second flow path member 8J.

As shown in FIGS. 22 and 24, when the first flow path member 7J is inverted from the correct disposition and is mispositioned in the third arrangement direction DH3, all of the plurality of guided portions 711J to 741J are not guided by the plurality of guide portions 81J to 84J. Instead, the sixth support portion 761 is guided by the third guide portion 83J, and the fifth support portion 751 is guided by the fourth guide portion 84J. At this time, the cross-sectional area of the sixth support portion 761 in the vertical direction perpendicular to the insertion direction DI is larger than the area of the virtual circle C30 related to the third guide portion 83J. That is, the outer shape of the sixth support portion 761 is larger than the inner diameter of the third guide portion 83J. Therefore, when the coupling operation that relatively moves the first flow path member 7J with respect to the second flow path member 8J is performed, the sixth support portion 761 interferes with the third guide portion 83J, so that the first flow path member 7J cannot be coupled to the second flow path member 8J. Therefore, in a state in which the first flow path member 7J is inverted from the correct disposition and then mispositioned along the third arrangement direction DH3, the first flow path member 7J can be prevented from being erroneously coupled to the second flow path member 8J.

As shown in FIGS. 22 and 24, when the first flow path member 7J is inverted from the correct disposition and is mispositioned in the fourth arrangement direction DH4, all of the plurality of guided portions 711J to 741J are not guided by the plurality of guide portions 81J to 84J. Instead, the eighth support portion 781 is guided by the first guide portion 81J, and the seventh support portion 771 is guided by the second guide portion 82J. At this time, the cross-sectional area of the seventh support portion 771 in the vertical direction perpendicular to the insertion direction DI is larger than the area of the virtual circle C20 related to the second guide portion 82J. That is, the outer shape of the seventh support portion 771 is larger than the inner diameter of the second guide portion 82J. Therefore, when the coupling operation that relatively moves the first flow path member 7J with respect to the second flow path member 8J is performed, the seventh support portion 771 interferes with the second guide portion 82J, so that the first flow path member 7J cannot be coupled to the second flow path member 8J. Therefore, in a state in which the first flow path member 7J is inverted from the correct disposition and then mispositioned along the fourth arrangement direction DH4, the first flow path member 7J can be prevented from being erroneously coupled to the second flow path member 8J.

As shown in FIGS. 22 and 24, in a state in which the first guided portion 711J is guided by the first guide portion 81J, a case will be described in which the first flow path member 7J rotates around the Z-axis along the insertion direction DI from the correct disposition. In this case, since the guided portions 721J to 741J other than the first guided portion 711J interfere with the guide portions 82J to 84J other than the first guide portion 81J, the first flow path member 7J cannot be coupled to the second flow path member 8J. Therefore, in a state in which the first flow path member 7J is rotated around the Z-axis along the insertion direction DI from the correct disposition, the first flow path member 7J can be prevented from being erroneously coupled to the second flow path member 8J.

According to the fifth embodiment, as shown in FIG. 22, the cross-sectional area of the second guided portion 721J in the vertical direction perpendicular to the insertion direction DI is smaller than the cross-sectional area of the third guided portion 731J in the vertical direction perpendicular to the insertion direction DI. Further, the cross-sectional area of the third guided portion 731J in the vertical direction perpendicular to the insertion direction DI is smaller than the cross-sectional area of the fourth guided portion 741J in the vertical direction perpendicular to the insertion direction DI. Further, the cross-sectional area of the fourth guided portion 741J in the vertical direction perpendicular to the insertion direction DI is smaller than the cross-sectional area of the first guided portion 711J in the vertical direction perpendicular to the insertion direction DI. When viewed in the insertion direction DI, the first line segment Li1 linking the second guided portion 721J to the third guided portion 731J intersects the second line segment Li2 linking the fourth guided portion 741J to the first guided portion 711J. As a result, as shown in FIG. 24, although the first flow path member 7J is mispositioned from the correct disposition in any of the arrangement directions DH1 to DH4, the erroneous insertion of the first flow path member 7 with respect to the second flow path member 8 can be reduced.

Further, according to the fifth embodiment, as shown in FIG. 23, although the first flow path member 7 is inverted around the Z-axis along the insertion direction DI from the correct disposition, the erroneous insertion of the first flow path member 7 with respect to the second flow path member 8 can be reduced.

Further, according to the fifth embodiment, as shown in FIGS. 22 and 24, although the first flow path member 7 is mispositioned after being inverted around the Z-axis along the insertion direction DI from the correct disposition, the erroneous insertion of the first flow path member 7 into the second flow path member 8 can be reduced.

Further, according to the fifth embodiment, as shown in FIGS. 22 and 24, although the first flow path member 7 is mispositioned from the correct disposition in any one direction of the first arrangement direction DH1, the second arrangement direction DH2, the third arrangement direction DH3, and the fourth arrangement direction DH4, the erroneous insertion can be reduced.

Further, according to the fifth embodiment, as shown in FIGS. 22 and 24, although the first flow path member 7 is rotated around the Z-axis along the insertion direction DI from the correct disposition, the erroneous insertion of the first flow path member 7 with respect to the second flow path member 8 can be reduced.

Further, according to the fifth embodiment, as shown in FIG. 22, a quadrangle having the apex of each of the first flow path pipe 71J, the second flow path pipe 72J, the third flow path pipe 73J, and the fourth flow path pipe 74J is a parallelogram. In this way, as shown in FIG. 23, in a state in which the first flow path member 7J is inverted around the Z-axis along the insertion direction DI from the correct disposition, the first flow path member 7J can be more reliably prevented from being erroneously coupled to the second flow path member 8J.

The cross-sectional area and the cross-sectional shape of the guided portions 711J to 741J shown in FIG. 22 in the vertical direction perpendicular to the insertion direction DI, and the areas and shapes of the virtual circles C10, C20, C30, and C40 of the corresponding guide portions 81J to 84J are not limited thereto. Further, the cross-sectional area and the cross-sectional shape of the support portions 751, 761, 771, and 781 in the vertical direction perpendicular to the insertion direction DI are not limited thereto, and may have other areas and shapes.

F. Other Embodiments

F-1: Other Embodiment 1

In other embodiments, when the first flow path member 7 has the plurality of flow path pipes 71 to 78, the first flow path member 7 may have one guided portion, and the second flow path member 8 may have one guide portion that guides the guided portion. In this case, for example, one guided portion may be provided in the flow path pipes 71 to 74 positioned at the end portions of the flow path pipes 71 to 78 in the arrangement direction, among the plurality of flow path pipes 71 to 78. The cross-sectional area of one guided portion in the vertical direction perpendicular to the insertion direction DI may be different from, for example, the cross-sectional area of the other support portion in the vertical direction perpendicular to the insertion direction DI. Even in such a form, in a state in which the first flow path member 7 is mispositioned from the correct disposition or rotated around the Z-axis along the insertion direction DI, the possibility that the first flow path member 7 is erroneously coupled to the second flow path member 8 can be reduced.

F-2: Other Embodiment 2

In other embodiments, when the first flow path member 7 has the plurality of flow path pipes 71 to 78, the first flow path member 7 may have two guided portions, and the second flow path member 8 may have two guide portions that guide the guided portions. In this case, for example, the two guided portions may be provided in the flow path pipes 71 to 74 positioned at both ends of the flow path pipes 71 to 78 in the arrangement direction, among the plurality of flow path pipes 71 to 78. The cross-sectional areas of the two guided portions in the vertical direction perpendicular to the insertion direction DI may be different from each other. Even in such a form, in a state in which the first flow path member 7 is mispositioned from the correct disposition or rotated around the Z-axis along the insertion direction DI, the possibility that the first flow path member 7 is erroneously coupled to the second flow path member 8 can be reduced.

F-3: Other Embodiment 3

In other embodiments, when the first flow path member 7 has the plurality of flow path pipes 71 to 78, the first flow path member 7 may have three guided portions, and the second flow path member 8 may have three guide portions that guide the guided portions. In this case, for example, three guided portions may be provided in the flow path pipes 71 to 74 positioned at both ends of the flow path pipes 71 to 78 in the arrangement direction, among the plurality of the flow path pipes 71 to 78. The cross-sectional areas of the two guided portions in the vertical direction perpendicular to the insertion direction DI may be different from each other. Even in such a form, in a state in which the first flow path member 7 is mispositioned from the correct disposition or rotated around the Z-axis along the insertion direction DI, the possibility that the first flow path member 7 is erroneously coupled to the second flow path member 8 can be reduced.

F-4: Other Embodiment 4

In the above embodiment, as shown in FIG. 2, the first flow path member 7 is provided in the flow path structure body 50, and the second flow path member 8 is provided in the flow path coupling member 60 of the liquid ejecting head 20. However, the present disclosure is not limited thereto. The first flow path member 7 may be provided in the flow path coupling member 60. When the first flow path member 7 is provided in the flow path coupling member 60, the second flow path member 8 is provided in the flow path structure body 50. Even in such a form, in the coupling operation, the guided portions 711 to 741 are guided by the guide portions 81 to 84 before the insertion portions 715 to 785 are inserted into the opening portions 821 to 828, so that positioning of the flow path structure body 50 and the flow path coupling member 60 of the liquid ejecting head 20 can be performed. Further, even in such a form, it is not necessary to provide the positioning member at a position different from the position of the flow path pipes 71 to 78 through which the liquid flows. Therefore, the first flow path member 7 and the second flow path member 8 can be miniaturized in both directions of the insertion direction DI of the first flow path member 7 with respect to the second flow path member 8 and the vertical direction perpendicular to the insertion direction DI. As a result, the flow path structure body 50 and the flow path coupling member 60 can be miniaturized in the three-dimensional directions of the X direction, the Y direction, and the Z direction.

F-5: Other Embodiment 5

In the above embodiment, as shown in FIGS. 10 and 12, the first flow path member 7 has the eight flow path pipes 71 to 78, and the second flow path member 8 has the eight opening portions 821 to 828 into which the eight flow path pipes 71 to 78 are inserted. However, the present disclosure is not limited thereto. The formation number of the flow path pipes 71 to 78 and the opening portions 821 to 828 may be one or more and seven or less, or nine or more. That is, in the above embodiment, as the flow paths 56 and 57 coupled to the first flow path member 7, two types of flow paths, that is, the supply flow path 56 and the collection flow path 57, are formed, but the present disclosure is not limited thereto, and the liquid ejecting apparatus 1 may include, for example, only the supply flow path 56.

Further, in the above embodiment, the types of ink are four types of cyan, magenta, yellow, and black, but the present disclosure is not limited thereto, and the types of ink flowing inside the first flow path member 7 and the second flow path member 8 may be one type or more and three types or less, or five types or more.

G. Other Aspects

The present disclosure is not limited to the above-described embodiments, and can be realized in various configurations without departing from the gist of the present disclosure. For example, technical features in the embodiments corresponding to technical features in respective aspects described in the summary of the present disclosure can be appropriately replaced or combined in order to solve some or all of the above-described problems or achieve some or all of the above-described effects. Unless the technical features are described as essential in the present specification, deletion thereof is possible as appropriate.

The present disclosure can also be realized in various forms other than the liquid ejecting apparatus. For example, it can be realized in the form of a manufacturing method of a liquid ejecting apparatus.

What is claimed is:

1. A liquid ejecting apparatus comprising:

a liquid ejecting head including one of a first flow path member and a second flow path member and configured to eject a liquid; and a flow path structure body including another of the first flow path member and the second flow path member, wherein the first and second flow path members are configured to perform a coupling operation that couples the first flow path member to the second flow path member by relatively moving the first flow path member with respect to the second flow path member in an insertion direction, the first flow path member has a base portion including a facing surface, and a first flow path pipe in which a flow path through which a liquid flows is formed and directly protruding from the facing surface of the base portion in the insertion direction, the second flow path member has a coupling surface having a first opening portion into which the first flow path pipe is inserted and facing the facing surface directly, and a first guide portion disposed in a direction opposite to the insertion direction with respect to the coupling surface, the first flow path pipe includes a first insertion portion inserted into the first opening portion, and the first guided portion in which a flow path of the liquid is formed, and the first guided portion is guided by the first guide portion before the first insertion portion is inserted into the first opening portion in the coupling operation, and the first guided portion is disposed between the first insertion portion and the base portion regarding the insertion direction.

2. The liquid ejecting apparatus according to claim 1, wherein the base portion restricts a relative movement of the first flow path member with respect to the second flow path member in the insertion direction by coming into contact with the first guide portion.

3. The liquid ejecting apparatus according to claim 2, wherein the base portion and the first guide portion are fixed by a fixing member.

4. The liquid ejecting apparatus according to claim 1, wherein in a coupled state in which the second flow path member is coupled to the first flow path member, when viewed in the insertion direction, a portion of the first guided portion is positioned between the first insertion portion and the first guide portion.

5. The liquid ejecting apparatus according to claim 1, wherein the first flow path member has flow path pipes including the first flow path pipe, the flow path pipes in which flow paths through which a liquid flows are respectively formed protrude from the base portion in the insertion direction, and the coupling surface has opening portions, which include the first opening portion, into which the flow path pipes are inserted, respectively.

6. The liquid ejecting apparatus according to claim 5, wherein the flow path pipes include a second flow path pipe, the opening portions include a second opening portion into which the second flow path pipe is inserted, the second flow path member further has a second guide portion disposed in the direction opposite to the insertion direction with respect to the coupling surface, the second flow path pipe includes a second insertion portion inserted into the second opening portion and a second guided portion that is guided by the second guide portion before the flow path pipes are respectively inserted into the opening portions in the coupling operation, the second guided portion is disposed between the second insertion portion and the base portion, and a cross-sectional shape of the second guided portion in a vertical direction perpendicular to the insertion direction is different from a cross-sectional shape of the first guided portion in the vertical direction perpendicular to the insertion direction.

7. The liquid ejecting apparatus according to claim 6, wherein the flow path pipes include a third flow path pipe, the opening portions include a third opening portion into which the third flow path pipe is inserted, the second flow path member further has a third guide portion disposed in the direction opposite to the insertion direction with respect to the coupling surface, the third flow path pipe includes a third insertion portion inserted into the third opening portion and a third guided portion that is guided by the third guide portion before the flow path pipes are respectively inserted into the opening portions in the coupling operation, the third guided portion is disposed between the third insertion portion and the base portion, and a cross-sectional shape of the third guided portion in the vertical direction perpendicular to the insertion direction is different from the cross-sectional shape of the first guided portion and the cross-sectional shape of the second guided portion.

8. The liquid ejecting apparatus according to claim 7, wherein the flow path pipes include a fourth flow path pipe, the opening portions include a fourth opening portion into which the fourth flow path pipe is inserted, the second flow path member further has a fourth guide portion disposed in the direction opposite to the insertion direction with respect to the coupling surface, the fourth flow path pipe includes a fourth insertion portion inserted into the fourth opening portion and a fourth guided portion that is guided by the fourth guide portion before the flow path pipes are respectively inserted into the opening portions in the coupling operation, the fourth guided portion is disposed between the fourth insertion portion and the base portion, and a cross-sectional shape of the fourth guided portion in the vertical direction perpendicular to the insertion direction is different from the cross-sectional shape of the first guided portion, the cross-sectional shape of the second guided portion, and the cross-sectional shape of the third guided portion.

9. The liquid ejecting apparatus according to claim 8, wherein a cross-sectional area of the second guided portion in the vertical direction perpendicular to the insertion direction is smaller than a cross-sectional area of the third guided portion in the vertical direction perpendicular to the insertion direction, the cross-sectional area of the third guided portion in the vertical direction perpendicular to the insertion direction is smaller than a cross-sectional area of the fourth guided portion in the vertical direction perpendicular to the insertion direction, the cross-sectional area of the fourth guided portion in the vertical direction perpendicular to the insertion direction is smaller than a cross-sectional area of the first guided portion in the vertical direction perpendicular to the insertion direction, and when viewed in the insertion direction, a line segment that links the second guided portion to the third guided portion intersects a line segment that links the fourth guided portion to the first guided portion.

10. The liquid ejecting apparatus according to claim 9, wherein when viewed in the insertion direction, a quadrangle having apexes of the first flow path pipe, the second flow path pipe, the third flow path pipe, and the fourth flow path pipe is a parallelogram.

11. The liquid ejecting apparatus according to claim 5, wherein the flow path pipes include a fifth flow path pipe, the opening portions include a fifth opening portion into which the fifth flow path pipe is inserted, and in a coupled state in which the second flow path member is coupled to the first flow path member, the fifth flow path pipe is in contact with the second flow path member only by a portion of the fifth flow path pipe inserted into the fifth opening portion.

12. The liquid ejecting apparatus according to claim 1, wherein the first guide portion protrudes from the coupling surface in the direction opposite to the insertion direction.

13. The liquid ejecting apparatus according to claim 1, wherein the first flow path pipe includes a portion that is disposed between the first guided portion and the first insertion portion, and of which a cross-sectional area in a vertical direction perpendicular to the insertion direction is gradually reduced from the first guided portion toward the first insertion portion.

14. The liquid ejecting apparatus according to claim 1, wherein the first insertion portion and the first guided portion overlap each other when viewed in the insertion direction.

15. The liquid ejecting apparatus according to claim 1, wherein another flow path communicating with the flow path of the first flow path pipe is formed in the base portion.

16. The liquid ejecting apparatus according to claim 1, wherein the base portion and the first flow path pipe are configured as a monolithic structure.

17. A liquid ejecting apparatus comprising:

a liquid ejecting head including one of a first flow path member and a second flow path member and configured to eject a liquid; and a flow path structure body including another of the first flow path member and the second flow path member, wherein the first and second flow path members are configured to perform a coupling operation that couples the first flow path member to the second flow path member by relatively moving the first flow path member with respect to the second flow path member in an insertion direction, the first flow path member has a base portion including a facing surface, and a first flow path pipe in which a flow path through which a liquid flows is formed and protruding directly from the facing surface of the base portion in the insertion direction, the second flow path member has a coupling surface having a first opening portion into which the first flow path pipe is inserted and facing the facing surface directly, and a first guide portion disposed in a direction opposite to the insertion direction with respect to the coupling surface, the first flow path pipe includes a first insertion portion inserted into the first opening portion and the first guided portion in which a flow path of the liquid is formed, and the first guided portion is disposed between the first insertion portion and the base portion regarding the insertion direction, and a distance in the insertion direction from an end surface of the first guide portion in the direction opposite to the insertion direction to the coupling surface is larger than a distance in the insertion direction from a coupling portion between the first insertion portion and the first guided portion to an end portion of the first insertion portion in the insertion direction.

18. The liquid ejecting apparatus according to claim 17, wherein the first insertion portion and the first guided portion overlap each other when viewed in the insertion direction.

19. The liquid ejecting apparatus according to claim 17, wherein another flow path communicating with the flow path of the first flow path pipe is formed in the base portion.

20. The liquid ejecting apparatus according to claim 17, wherein the base portion and the first flow path pipe are configured as a monolithic structure.

* * * * *